US008977438B2

(12) United States Patent
Ono

(10) Patent No.: US 8,977,438 B2
(45) Date of Patent: Mar. 10, 2015

(54) VEHICLE STEERING APPARATUS, METHOD AND NON-TRANSITORY COMPUTER READABLE MEDIUM

(71) Applicant: Kabushiki Kaisha Toyota Chuo Kenkyusho, Nagakute-shi, Aichi-ken (JP)

(72) Inventor: Eiichi Ono, Toyota (JP)

(73) Assignee: Kabushiki Kaisha Toyota Chuo Kenkyusho, Nakagute (JP)

( * ) Notice: Subject to any disclaimer, the term of this patent is extended or adjusted under 35 U.S.C. 154(b) by 0 days.

(21) Appl. No.: 14/074,343

(22) Filed: Nov. 7, 2013

(65) Prior Publication Data

US 2014/0136056 A1 May 15, 2014

(30) Foreign Application Priority Data

Nov. 13, 2012 (JP) .................................. 2012-249194

(51) Int. Cl.
*B60T 8/26* (2006.01)
*B62D 6/00* (2006.01)
*B62D 5/00* (2006.01)

(52) U.S. Cl.
CPC ................ *B62D 6/006* (2013.01); *B62D 6/008* (2013.01)
USPC ................................ 701/42; 701/69; 180/197

(58) Field of Classification Search
CPC ........... B60T 8/26; B60T 8/245; B60T 8/246; B62D 5/00; B62D 6/002; B62D 6/003; G06F 19/00
USPC .................. 701/41, 42, 36, 69; 180/6.24, 197
See application file for complete search history.

(56) References Cited

U.S. PATENT DOCUMENTS

| 4,467,885 A * | 8/1984 | Furukawa et al. ............ 180/414 |
| 6,804,594 B1 | 10/2004 | Chen et al. |
| 2004/0019417 A1 * | 1/2004 | Yasui et al. ..................... 701/36 |
| 2004/0148077 A1 * | 7/2004 | Yasui et al. ..................... 701/41 |
| 2007/0233352 A1 | 10/2007 | Miyashita et al. |

FOREIGN PATENT DOCUMENTS

| JP | A-2005-218222 | 8/2005 |
| JP | A-2006-182050 | 7/2006 |
| JP | A-2007-290694 | 11/2007 |
| JP | A-2008-081008 | 4/2008 |
| JP | A-2008-114687 | 5/2008 |
| JP | A-2009-051308 | 3/2009 |

OTHER PUBLICATIONS

Sep. 2, 2014 Office Action issued in Japanese Application No. 2012-249194 (with translation).

* cited by examiner

*Primary Examiner* — Tan Q Nguyen
(74) *Attorney, Agent, or Firm* — Oliff PLC

(57) ABSTRACT

According to a relaxation length compensation torque computation section 54 of a vehicle steering apparatus 100, a relaxation length compensation torque is computed based on (1) a front wheel actual steering angular velocity computed from a motor rotation angular velocity input by a front wheel actual steering angular velocity computation section 52, and based on (2) a transfer function that is (a) expressed using a difference between a road surface reaction torque model and a referential reaction torque model and that is (b) determined according to a vehicle velocity input by a vehicle velocity sensor 20. A power steering controller 58 adds the relaxation length compensation torque to an assistance torque, and controls an EPS motor 3 so as to generate the assistance torque to which the relaxation length compensation torque has been added. The relaxation length compensation torque is thereby computed with good precision, enabling high handling performance to be achieved.

9 Claims, 15 Drawing Sheets

VEHICLE VELOCITY = 20km/h

VEHICLE VELOCITY = 40km/h

VEHICLE VELOCITY = 60km/h

VEHICLE VELOCITY = 80km/h

US 8,977,438 B2

VEHICLE STEERING APPARATUS, METHOD AND NON-TRANSITORY COMPUTER READABLE MEDIUM

CROSS-REFERENCE TO RELATED APPLICATION

This application is based on and claims priority under 35 USC 119 from Japanese Patent Application No. 2012-249194 filed Nov. 13, 2012.

TECHNICAL FIELD

The present invention relates to a vehicle steering apparatus and program, and in particular to a vehicle steering apparatus and program that controls so as to generate assistance torque of electrical power steering.

BACKGROUND ART

Dynamic characteristics of tire slip angle and lateral force (see FIG. 1) are expressed in terms of a parameter called relaxation length. The relaxation length varies according to various factors such as ground contact load, and longer delays occur in the generation of lateral force as the relaxation length gets longer, with this adversely affecting the handling performance.

Conventionally, in order to compensate for the influence of relaxation length, consideration is given to the influence of delay in cornering force or self-aligning torque on the power steering performance, and influence of the relaxation length is compensated for by phase lead control for such delay (see JP-A No. 2008-114687).

In the technology described in JP-A No. 2008-114687, phase lead control is performed on SAT compensation values as estimated values of self-aligning torque, and compensation for phase delay is performed.

SUMMARY OF INVENTION

Technical Problem

However, there is an issue with phase lead control in that gain in the high frequency region becomes large, there is a susceptibility to being affected by noise such as high frequency vibrations. Generally low pass filter processing is considered in order to reduce such noise, however low pass filter has the property of delaying the phase, which cancels out the effect of phase lead control.

The present invention is directed towards addressing the above issues.

According to a first aspect of the invention, a vehicle steering apparatus is configured including: a vehicle velocity detection unit that detects a vehicle velocity; a state amount detection unit that detects a front wheel actual steering angle state amount of a vehicle; a computation unit that computes a relaxation length compensation torque based on (1) a transfer function that is (a) expressed using a difference between a road surface reaction torque model that considers dynamic characteristics of tires according to a relaxation length to derive a first road surface reaction torque based on the front wheel actual steering angle state amount, and a referential reaction torque model that does not consider the dynamic characteristics of tires according to the relaxation length to derive a second road surface reaction torque based on the front wheel actual steering angle state amount, and that (b) expresses a relaxation length compensation torque that is a steering torque predetermined according to the vehicle velocity detected by the vehicle velocity detection unit to compensate for the relaxation length for the front wheel actual steering angle state, and based on (2) the front wheel actual steering angle state amount detected by the state amount detection unit; a summing unit that adds the relaxation length compensation torque computed by the computation unit to an assistance torque of electrical power steering; and a steering torque control unit that controls so as to generate the assistance torque that has been summed by the summing unit.

According to a second aspect of the invention, a vehicle steering apparatus is configured including: a vehicle velocity detection unit that detects a vehicle velocity; a state amount detection unit that detects a front wheel actual steering angle state amount of a vehicle; a road surface reaction torque computation unit that computes a first road surface reaction torque based on (1) a road surface reaction torque model that considers dynamic characteristics of tires according to a relaxation length and that is predetermined to derive the first road surface reaction torque based on the front wheel actual steering angle state amount, on (2) the front wheel actual steering angle state amount detected by the state amount detection unit, and on (3) the vehicle velocity detected by the vehicle velocity detection unit; a referential reaction torque computation unit that computes a second road surface reaction torque based on (1) a referential reaction torque model that does not consider the dynamic characteristics of tires according to the relaxation length and that is predetermined to derive the second road surface reaction torque based on the front wheel actual steering angle state amount, on (2) the front wheel actual steering angle state amount, and on (3) the vehicle velocity; a relaxation length compensation torque computation unit that computes a difference between the second road surface reaction torque computed by the referential reaction torque computation unit and the first road surface reaction torque computed by the road surface reaction torque computation unit as a relaxation length compensation torque that is a steering torque to compensate for the relaxation length; a summing unit that adds the relaxation length compensation torque computed by the relaxation length compensation torque computation unit to an assistance torque of electrical power steering; and a steering torque control unit that controls so as to generate the assistance torque that has been summed by the summing unit.

BRIEF DESCRIPTION OF THE DRAWINGS

Exemplary embodiments of the present invention will be described in detail based on the following figures, wherein.

DETAILED DESCRIPTION

Figure 1:
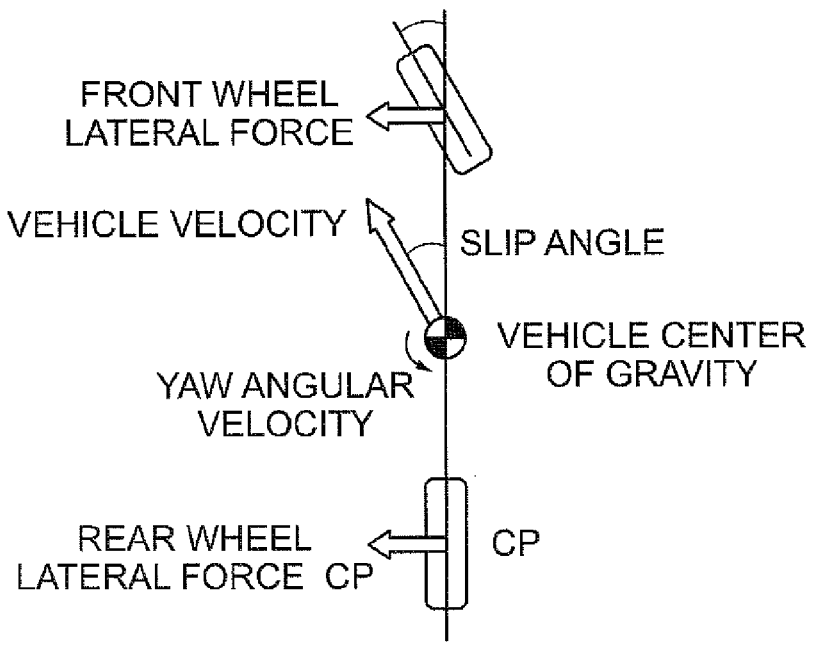
FIG. 1 is a drawing illustrating dynamic characteristics of tire slip angle and lateral force.

Detailed explanation follows regarding exemplary embodiments of the present invention, with reference to the drawings.

Principles of the Invention

Explanation first follows regarding the principles for estimating compensation torque. The present invention does not phase lead based on the already phase-delayed cornering force and self-aligning torque, and instead focusses on the front wheel steering angle state quantity that is a factor in cornering force generation. The present invention compensates for dynamic characteristics of cornering force based on a vehicle motion model from front wheel steering angle state quantity.

The front wheel steering angle state quantity does not need to use the results of a phase lead data amount compared to the self-aligning torque in phase lead control to compensate for dynamic characteristics of cornering force. The gain in the high frequency region during compensation accordingly does not become large, eliminating concern of being influenced by noise, such as high frequency vibration.

A system is known for coupling vehicle motion to the dynamic characteristics of steering, as described by the following motion equations (1) to (8) (see Non-Patent Document: Investigation on Relationship between Characteristics of Steering Wheel Torque and Behavior of Driver-Vehicle System, Yamada et al. in Proceedings of Society of Automobile Engineers of Japan, May 2012 No. 34)

$$I_1 \ddot{\theta}_1 + C_1 \dot{\theta}_1 + K_{tb}(\theta_1 - \theta_2) = T_1 \qquad \text{Equation (1)}$$

$$I_2 \ddot{\theta}_2 + C_2 \dot{\theta}_2 + K_{tb}(\theta_2 - \theta_1) + R_2(\dot{\theta}_2) + T_{SAT} = \alpha K_{tb}(\theta_1 - \theta_2) \qquad \text{Equation (2)}$$

$$\delta = \frac{\theta_2}{N} \qquad \text{Equation (3)}$$

$$T_{SAT} = \frac{\xi F_f}{N} \qquad \text{Equation (4)}$$

$$MV(\dot{\beta} + r) = F_f + F_r \qquad \text{Equation (5)}$$

$$I\dot{r} = L_f F_f - L_r F_r \qquad \text{Equation (6)}$$

$$F_f = -K_f\left(\beta + \frac{L_f}{V}r - \delta\right) \qquad \text{Equation (7)}$$

$$F_r = -K_r\left(\beta - \frac{L_r}{V}r\right) \qquad \text{Equation (8)}$$

Wherein: $\theta_1$ is steering angle; $T_1$ is steering torque; $I_1$ is steering wheel inertial moment; $C_1$ is steering wheel attenuation coefficient; $K_{tb}$ is torsion bar stiffness; $\theta_2$ is column shaft rotation angle; $T_{SAT}$ is road surface reaction torque (self-aligning torque); $I_2$ is motor inertial moment; $C_2$ is a column shaft attenuation coefficient; $R_2$ is friction torque; $\alpha$ is an assistance torque coefficient; $\delta$ is a front wheel actual steering angle; $\beta$ is a vehicle slip angle; r is yaw angular velocity; M is vehicle mass; I is yaw inertial moment; $F_f$, $F_r$ are front and rear wheel cornering forces; $K_f$, $K_r$ are front and rear wheel cornering stiffnesses; $L_f$, $L_r$ are front and rear wheel vehicle axis-center of gravity distances; $\xi$ is trail length; N is overall gear ratio; and V is vehicle velocity.

The formulae described above are characteristics that are actually accompanied by a time delay due to representing a model that ignores the dynamic characteristics of tires. The above Equations (7), (8) are modeled by the following Equations (9), (10).

$$F_f + \tau_f \dot{F}_f = -K_f\left(\beta + \frac{L_f}{V}r - \delta\right) \qquad \text{Equation (9)}$$

$$F_r + \tau_r \dot{F}_r = -K_r\left(\beta - \frac{L_r}{V}r\right) \qquad \text{Equation (10)}$$

Wherein: $\tau_f$, $\tau_r$ are time constants of front and rear tire lateral force generation, and are expressed by the following Equations (11), (12). $\sigma_f$, $\sigma_r$ are front and rear wheel relaxation lengths.

$$\tau_f = \frac{\sigma_f}{V} \qquad \text{Equation (11)}$$

$$\tau_r = \frac{\sigma_r}{V} \qquad \text{Equation (12)}$$

The presence of the above tire dynamic characteristics have an influence on the coupling characteristics between steering and vehicle motion.

Figure 3:
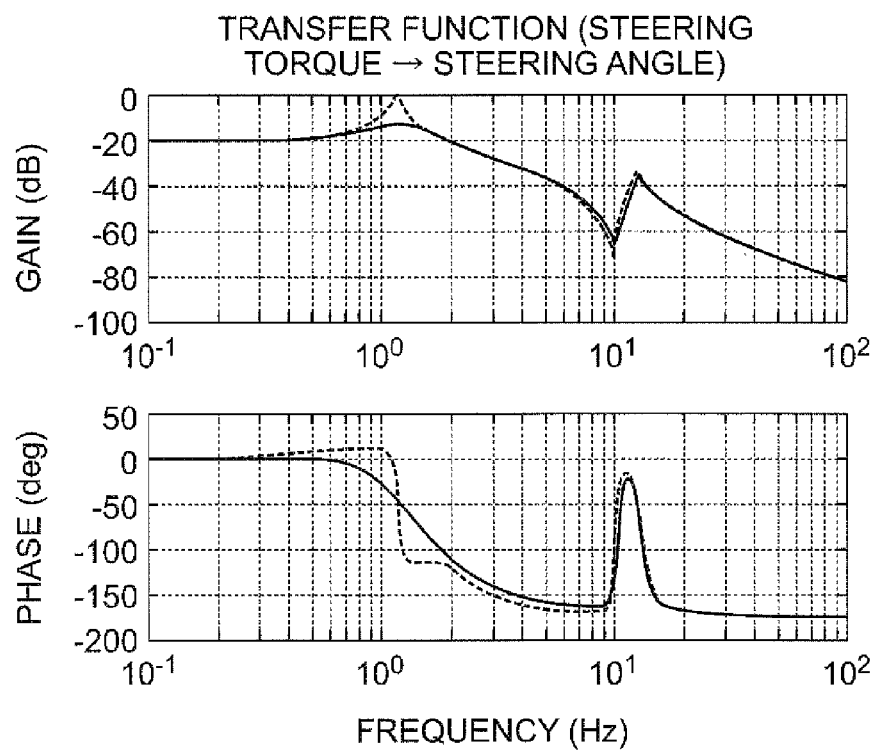
FIG. 3 is a diagram illustrating a Bode plot from steering torque to steering angle.

FIG. 3 illustrates a Bode plot from steering torque to steering angle. The solid line represents a model of Equations (1) to (8) that do not consider the relaxation length, and the intermittent lines represent a model of Equations (1) to (6) and (9) to (12) that take into consideration the relaxation length. It can be seen from these figures that a resonance phenomenon occurs close to 1 Hz in the model that considers relaxation length, and it is important to consider the relaxation length when discussing the handling performance of vehicle motion.

An object of the present invention is to change the characteristics of the intermittent line in FIG. 3 to those of the solid line, by controlling the electrical power steering.

Figure 4:
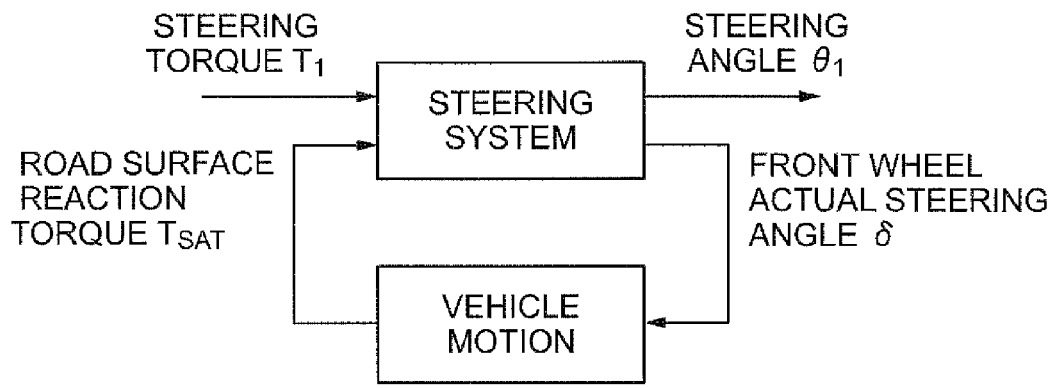
FIG. 4 is a diagram illustrating a block diagram of a coupling system.

First, as illustrated in FIG. 4, the model of Equations (1) to (6) and (9) to (12) that considers relaxation length is split into (a) a steering system with inputs of the steering torque and the road surface reaction torque and outputs of a steering angle and a front wheel actual steering angle, and (b) vehicle motion with inputs of front wheel actual steering angle and outputs of road surface reaction torque. The steering system can be represented here by the following state equations in Equations (13), (14).

$$\dot{x}_s = A_s x_s + B_s u_s \quad \text{Equation (13)}$$

$$y_s = C_s x_s + D_s u_s \quad \text{Equation (14)}$$

Wherein: $A_s$, $B_s$, $C_s$, $D_s$, $x_s$, $u_s$, $y_s$ are as expressed by the following Equations (15) to (21). Note that the $K_{frc}$ is the coefficient of elasticity of friction torque as represented by the term $R_2(\theta_2)$ in Equation (2). The steering system expressed by Equations (13), (14) and the following Equations (15) to (21) also includes normal power steering control logic, and envisages simple logic to provide assistance with torque that is proportional ($\alpha$ times) the twisting torque of a torsion bar.

$$A_s = \begin{bmatrix} 0 & 1 & 0 & 0 \\ -\frac{K_{tb}(1+\alpha)+K_{frc}}{I_2} & -\frac{C_2}{I_2} & \frac{K_{tb}(1+\alpha)}{I_2} & 0 \\ 0 & 0 & 0 & 1 \\ \frac{K_{tb}}{I_1} & 0 & -\frac{K_{tb}}{I_1} & -\frac{C_1}{I_1} \end{bmatrix} \quad \text{Equation (15)}$$

$$B_s = \begin{bmatrix} 0 & 0 \\ 0 & -\frac{\xi}{I_2 N} \\ 0 & 0 \\ \frac{1}{I_1} & 0 \end{bmatrix} \quad \text{Equation (16)}$$

$$C_s = \begin{bmatrix} 0 & 0 & 1 & 0 \\ \frac{1}{N} & 0 & 0 & 0 \end{bmatrix} \quad \text{Equation (17)}$$

$$D_s = \begin{bmatrix} 0 & 0 \\ 0 & 0 \end{bmatrix} \quad \text{Equation (18)}$$

$$x_s = [\theta_2 \ \dot{\theta}_2 \ \theta_1 \ \dot{\theta}_1]^T \quad \text{Equation (19)}$$

$$u_s = [T_1 \ T_{SAT}]^T \quad \text{Equation (20)}$$

$$y_s = [\theta_1 \ \delta]^T \quad \text{Equation (21)}$$

Moreover, vehicle motion can be expressed by state equations of the following Equation (22), (23). Wherein, $A_v$, $B_v$, $C_v$, $D_v$, $x_v$, $u_v$, $y_v$ are as expressed by the following Equations (24) to (30).

$$\dot{x}_v = A_v x_v + B_v u_v \quad \text{Equation (22)}$$

$$y_v = C_v x_v + D_v u_v \quad \text{Equation (23)}$$

$$A_v = \begin{bmatrix} 0 & -1 & \frac{1}{MV} & \frac{1}{MV} \\ 0 & 0 & \frac{L_f}{I} & -\frac{L_r}{I} \\ -\frac{K_f}{\tau_f} & -\frac{L_f K_f}{\tau_f V} & -\frac{1}{\tau_f} & 0 \\ -\frac{K_r}{\tau_r} & \frac{L_r K_r}{\tau_r V} & 0 & -\frac{1}{\tau_r} \end{bmatrix} \quad \text{Equation (24)}$$

$$B_v = \begin{bmatrix} 0 \\ 0 \\ \frac{K_f}{\tau_f} \\ 0 \end{bmatrix} \quad \text{Equation (25)}$$

$$C_v = \begin{bmatrix} 0 & 0 & \frac{\xi}{N} & 0 \end{bmatrix} \quad \text{Equation (26)}$$

$$D_v = 0 \quad \text{Equation (27)}$$

$$x_v = [\beta \ r \ F_f \ F_r]^T \quad \text{Equation (28)}$$

$$u_v = \delta \quad \text{Equation (29)}$$

$$y_v = T_{SAT} \quad \text{Equation (30)}$$

Equations (22) to (30) are a model that contains relaxation length, but an ideal vehicle model that does not contain relaxation length can be expressed by the following Equations (31), (32). Wherein $A_{v0}$, $B_{v0}$, $C_{v0}$, $D_{v0}$, $x_{v0}$, $u_{v0}$, $y_{v0}$ are expressed by the following Equations (33) to (39).

$$\dot{x}_{v0} = A_{v0} x_{v0} + B_{v0} u_{v0} \quad \text{Equation (31)}$$

$$y_{v0} = C_{v0} x_{v0} + D_{v0} u_{v0} \quad \text{Equation (32)}$$

$$A_{v0} = \begin{bmatrix} -\frac{K_f + K_r}{MV} & -1 - \frac{L_f K_f - L_r K_r}{MV^2} \\ -\frac{L_f K_f - L_r K_r}{1} & -\frac{L_f^2 K_f + L_r^2 K_r}{IV} \end{bmatrix} \quad \text{Equation (33)}$$

$$B_{v0} = \begin{bmatrix} \frac{K_f}{MV} \\ \frac{L_f K_f}{I} \end{bmatrix} \quad \text{Equation (34)}$$

$$C_{v0} = \begin{bmatrix} -\frac{\xi K_f}{N} & -\frac{\zeta L_f K_f}{NV} \end{bmatrix} \quad \text{Equation (35)}$$

$$D_{v0} = \frac{\xi K_f}{N} \quad \text{Equation (36)}$$

$$x_{v0} = [\beta \ r]^T \quad \text{Equation (37)}$$

$$u_{v0} = \delta \quad \text{Equation (38)}$$

$$y_{v0} = T_{SAT} \quad \text{Equation (39)}$$

Figure 5:
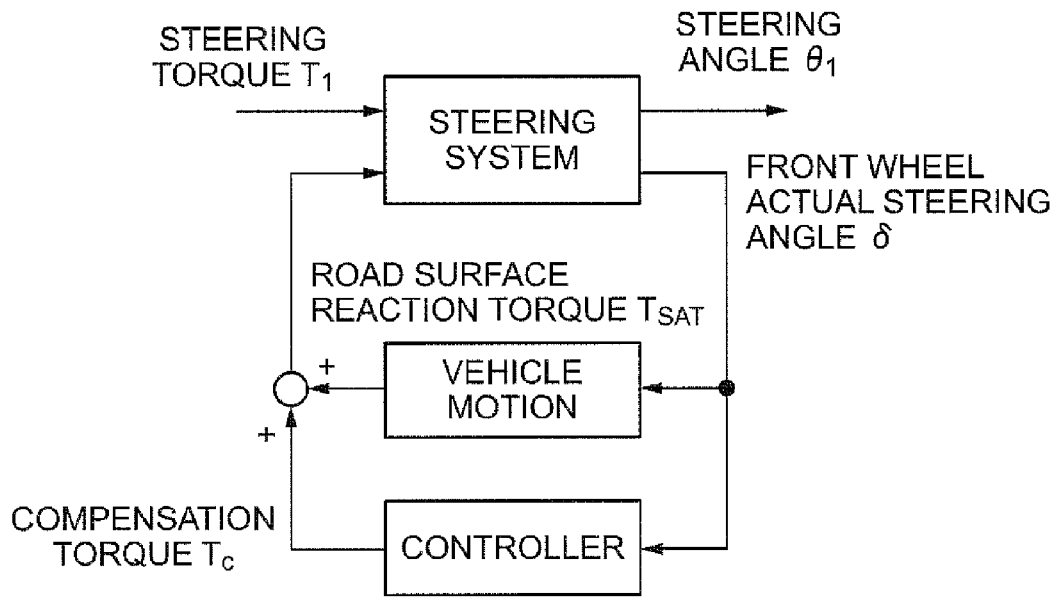
FIG. 5 is a diagram illustrating a control system configuration.

As can be seen from Equation (20), the road surface reaction torque has an influence as an input from the vehicle motion to the steering system. As illustrated in FIG. 5, the compensation torque of the electrical power steering is computed from the front wheel actual steering angle, as the torque of the electrical power steering motor to be added to the road surface reaction torque to contribute to rotation motion of the column shaft. By configuring the controller in parallel to the vehicle motion, the influence from the vehicle motion can be adjusted freely. When this is performed, the input to the steering system of Equation (20) is expressed by the following Equation (40), wherein $T_c$ is the compensation torque.

$$u_s = [T_1\ T_{SAT} + T_c]^T \quad \text{equation (40)}$$

Figure 6:
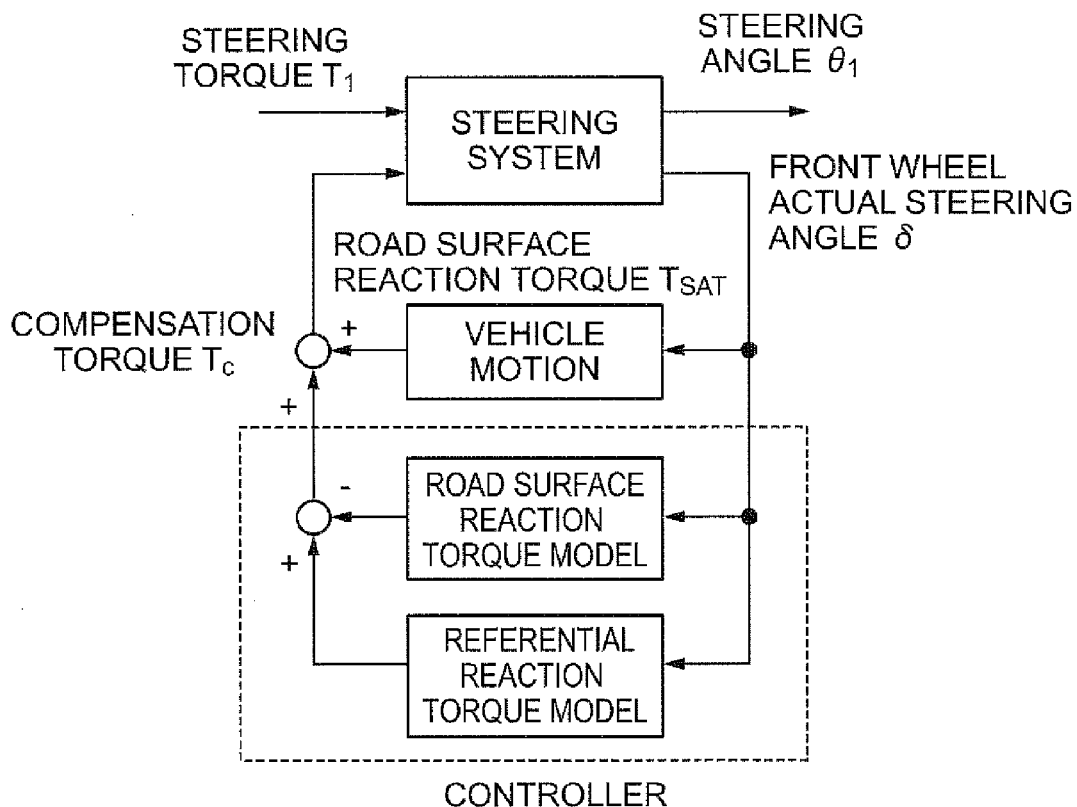
FIG. 6 is a diagram illustrating a configuration of a controller.

The controller is configured as illustrated in FIG. 6 to compensate for the influence of tire relaxation length to road surface reaction torque. In this diagram, the road surface reaction torque model is a vehicle motion model containing a tire relaxation length to estimate the road surface reaction torque, and is expressed by Equations (22) to (30). Moreover, the referential reaction torque model is a vehicle motion model to estimate the referential reaction torque that does not contain a tire relaxation length, and is expressed by Equations (31) to (39).

The output of the road surface reaction torque that is the output of the vehicle motion in FIG. 6 and the output of the road surface reaction torque model in the controller match and cancel each other out, and the input to the steering system becomes the referential reaction torque alone. As a result, the driver does not feel a delay in the tire generation force and is able to perform steering operation.

Therefore the controller that computes the compensation torque from the front wheel actual steering angle may be expressed by the following Equation (41). Wherein: $K(s)$ is the road surface reaction torque model as expressed by Equations (21) to (30); and $K_0(s)$ is the referential reaction torque model as expressed by Equations (31) to (39).

$$T(s) = K(s) \cdot \delta \quad \text{Equation (41)}$$
$$T_0(s) = K_0(s) \cdot \delta$$
$$T_c(s) = T - T_0$$
$$= (K(s) - K_0(s))\delta$$

Figure 7:
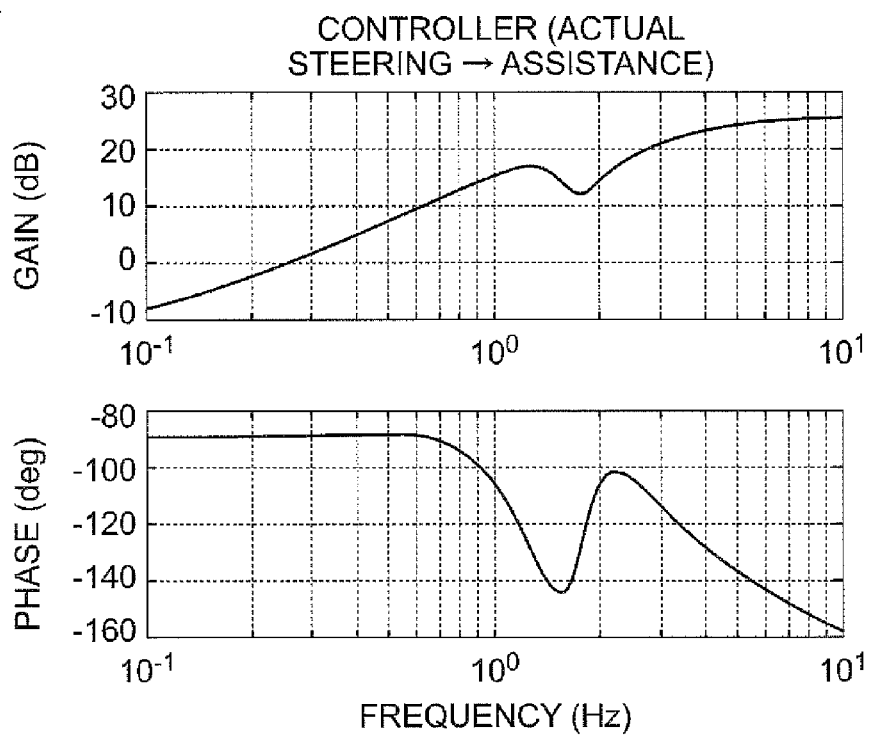
FIG. 7 is a diagram illustrating a Bode plot of the controller.

FIG. 7 illustrates the frequency characteristics of the controller illustrated in FIG. 6. Since the steady state characteristics of the vehicle model containing the tire relaxation length expressed by Equations (22) to (30) and the ideal vehicle motion model not containing the tire relaxation length as expressed by Equations (31) to (39) match each other, the characteristics illustrated in FIG. 7 are characteristics in which the gain in the low frequency region is small. When this occurs, the constant term in the numerator polynomial of the transfer function of the controller becomes 0, and the above Equation (41) can be modified to be expressed as the following Equation (42). Wherein s is a Laplace operator, $G(s)$ is a controller for computing compensation torque from the front wheel actual steering angular velocity ($=s \cdot \delta$). The characteristics of the controller become the characteristics of the Bode plot illustrated in FIG. 8. Note that the transfer function $G(s)$ is an example of a transfer function that is (1) expressed using the difference between the road surface reaction torque model and the referential reaction torque model, and is (2) expressed by the relaxation length compensation torque that is the steering torque predetermined according to vehicle velocity to compensate for the relaxation length for the front wheel steering angle state quantity.

$$T_c(s) = T - T_0 \quad \text{Equation (42)}$$
$$= (K(s) - K_0(s))\delta$$
$$= \frac{A(s) \cdot s}{B(s)} \cdot \delta$$
$$= \frac{A(s)}{B(s)} s \cdot \delta$$
$$T_c(s) = G(s) \cdot s \cdot \delta$$

Figure 8:
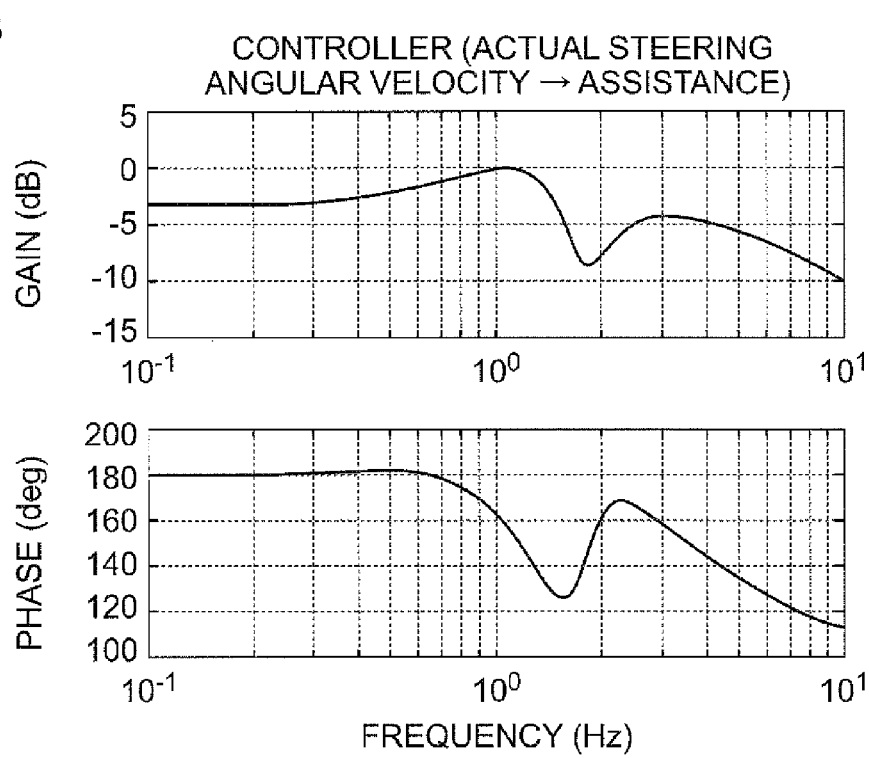
FIG. 8 is a diagram illustrating a controller when the front wheel actual steering angular velocity is the observation quantity.
Figure 9:
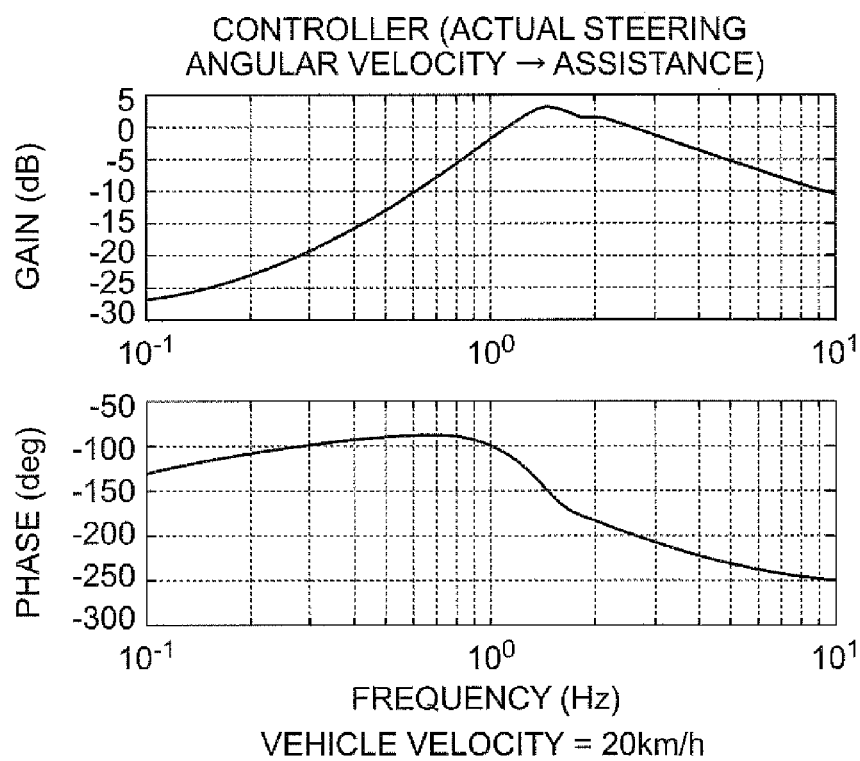
FIG. 9 is a controller Bode plot from steering angular velocity to assistance torque.
Figure 10:
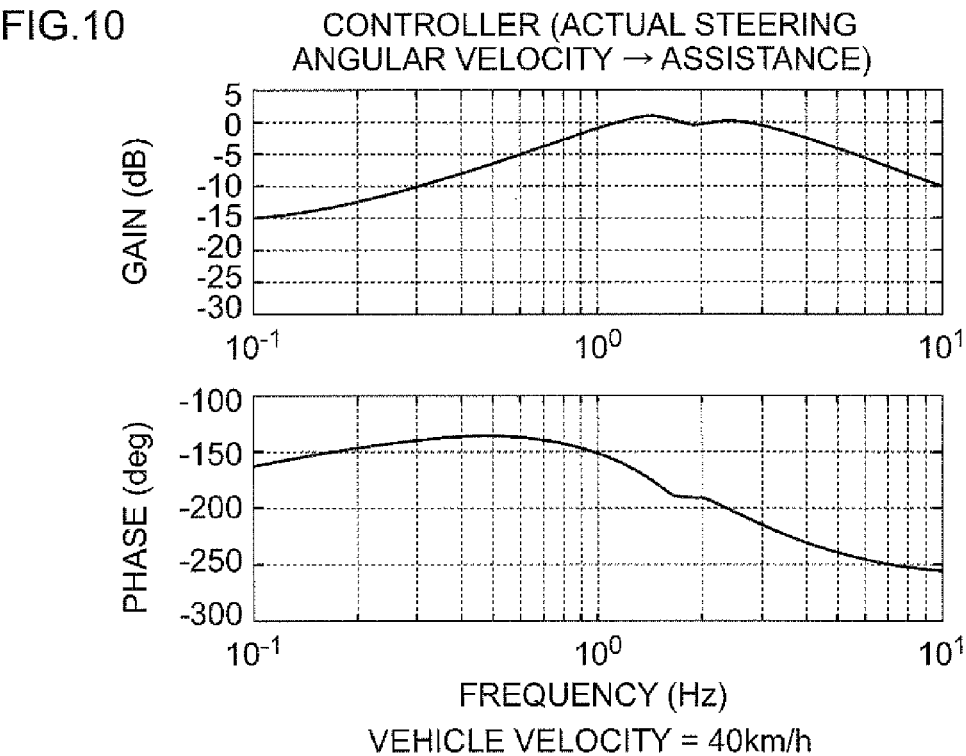
FIG. 10 is a controller Bode plot from steering angular velocity to assistance torque.
Figure 11:
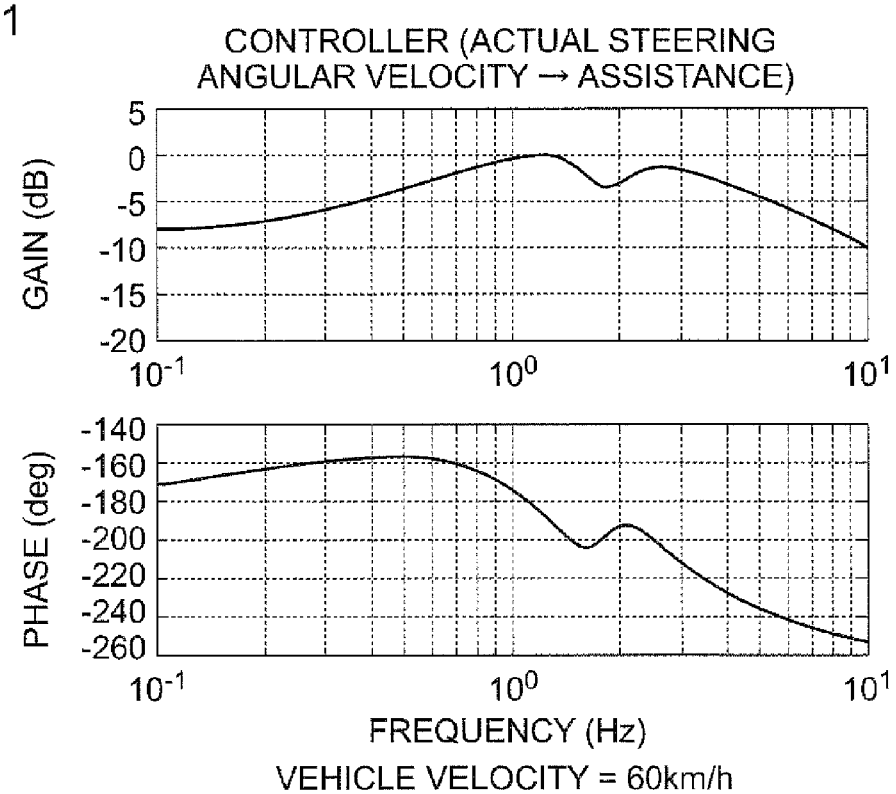
FIG. 11 is a controller Bode plot from steering angular velocity to assistance torque.
Figure 12:
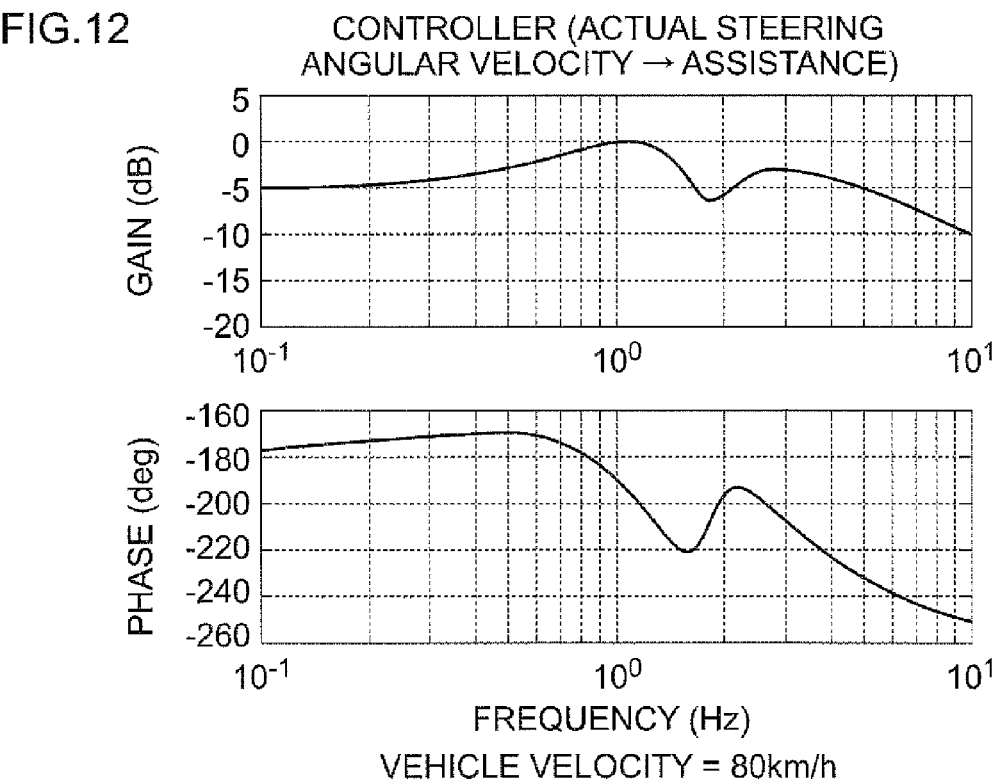
FIG. 12 is a controller Bode plot from steering angular velocity to assistance torque.

Moreover, the characteristics of the Bode plot illustrated in FIG. 8 are characteristics at a specific velocity, and the characteristics differ according to the vehicle speed as illustrated in FIG. 9 to FIG. 12.

Although sensing the front wheel actual steering angle is not easy, the front wheel actual steering angular velocity can be converted from the motor angular velocity of the electrical power steering. Configuring a controller to have the characteristics illustrated in Equation (42) and FIG. 8 enables the problem to be overcome in practice. Moreover, the controller having the characteristics illustrated in FIG. 8 has sufficiently small gain in the high frequency region of 10 Hz and above, and so there is no need to be concerned about an adverse impact from noise, such as from high frequency vibration.

Figure 13:
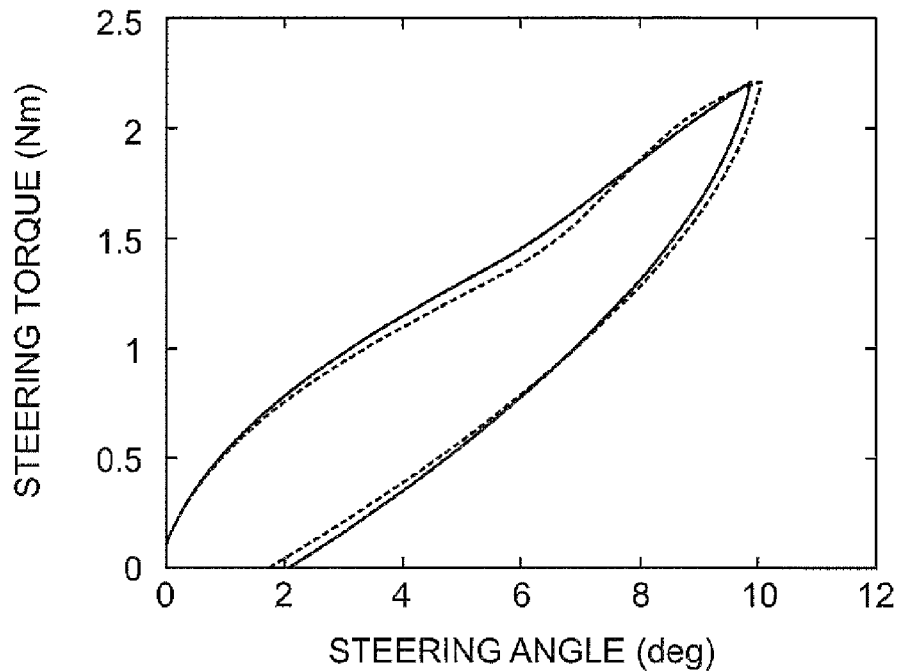
FIG. 13 is a graph illustrating characteristics of steering torque against steering angle.

FIG. 13 illustrates a comparison of steering angle-steering torque when, during travelling at 100 km/h, a steering torque of 2.2 Nm is input with a sine wave profile of 1.0 rad/s. The solid line expresses a case with relaxation length compensation, and the intermittent line indicates a case in which no such control is performed.

Figure 14:
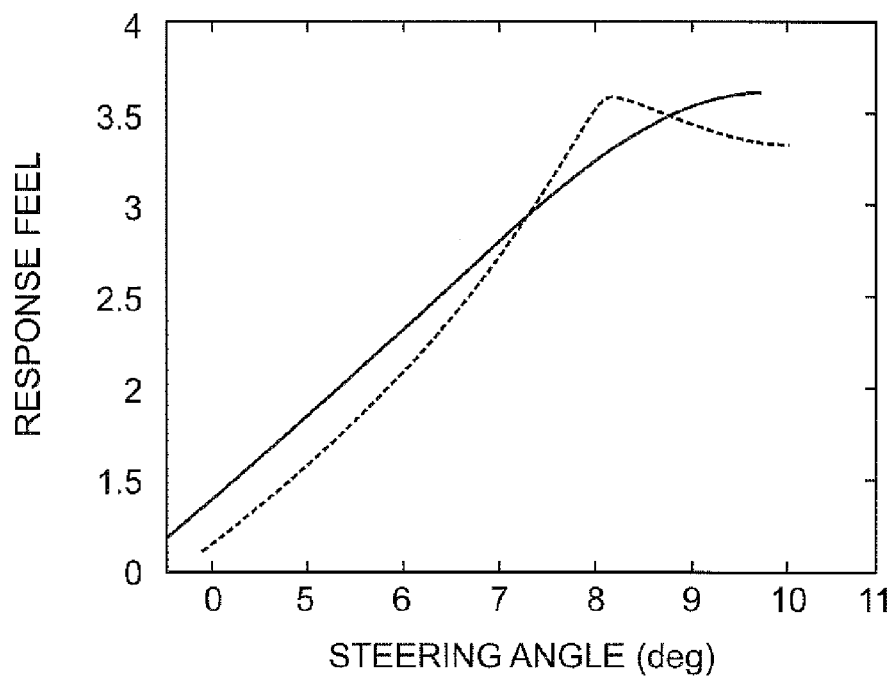
FIG. 14 is a graph illustrating characteristics of response feel against steering angle.

FIG. 14 indicates the response feel felt by a driver when turning the steering wheel, and illustrates a result of computation from the steering angle and the steering torque. Note that solid line expresses a case with relaxation length compensation, and the intermittent line expresses a case in which no such control is performed.

The amount of response feel of the vertical axis is an index of the response feel felt by a given driver quantified based on the tactile characteristics of the driver, and is derived from a mapping of feeling intensity of a proportional change in steering torque to a change in steering angle against feeling intensity of steering torque (see JP-A No. 2011-57173 and JP-A No. 2009-279967).

It can be seen that when there is no such control, as a result of lag in tire generation force, the response feel is small at the initial state of steering in the vicinity of 6 to 7 degrees, and after that there is a rapid increase in the response feel in the vicinity of 8 degrees.

In contrast thereto, when the control of the present invention is performed, as a result of compensating for the influence imparted to the steering system by the lag in tire generation force, there is a smooth increase in response feel without lag, and as a result high handling performance can be expected.

Figure 2:
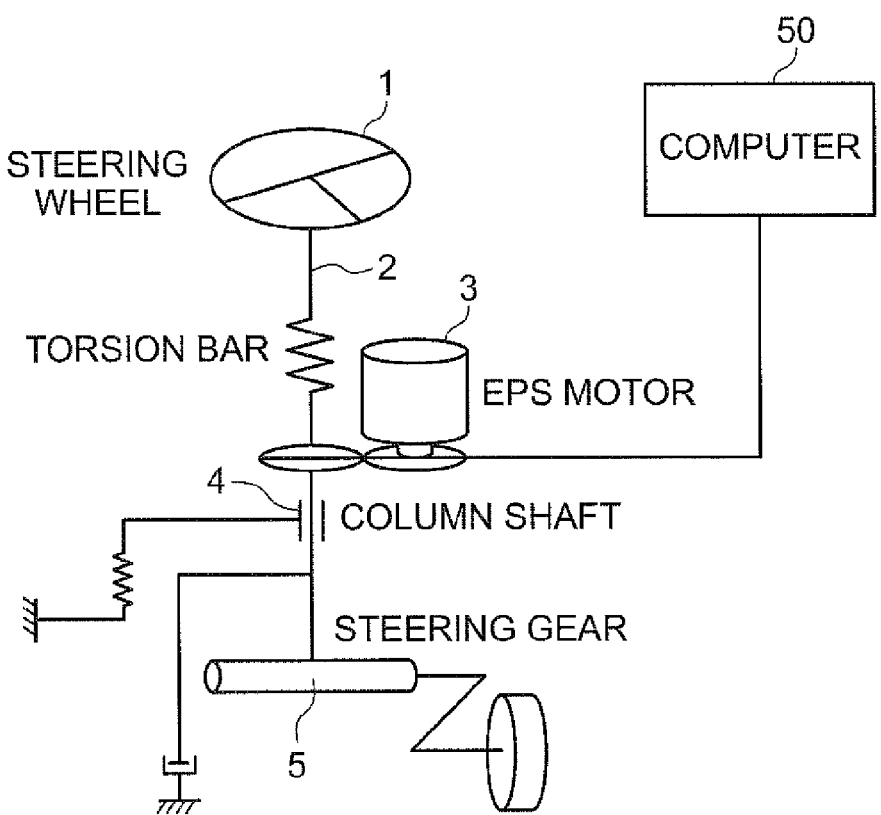
FIG. 2 is a schematic configuration diagram illustrating a configuration of a vehicle steering apparatus of a first exemplary embodiment.

Configuration of Vehicle Steering Apparatus According to a First Exemplary Embodiment As illustrated in FIG. 2, in the vehicle steering apparatus 100 according to a first exemplary embodiment of the present invention, an EPS motor 3 is attached to a torsion bar 2 that is coupled to a steering wheel 1. The EPS motor 3 is linked to a computer 50.

The EPS motor 3 outputs to the steering wheel a steering assistance torque for changing the turn angle of the steering wheel through a column shaft 4 and a steering gear 5.

Figure 19:
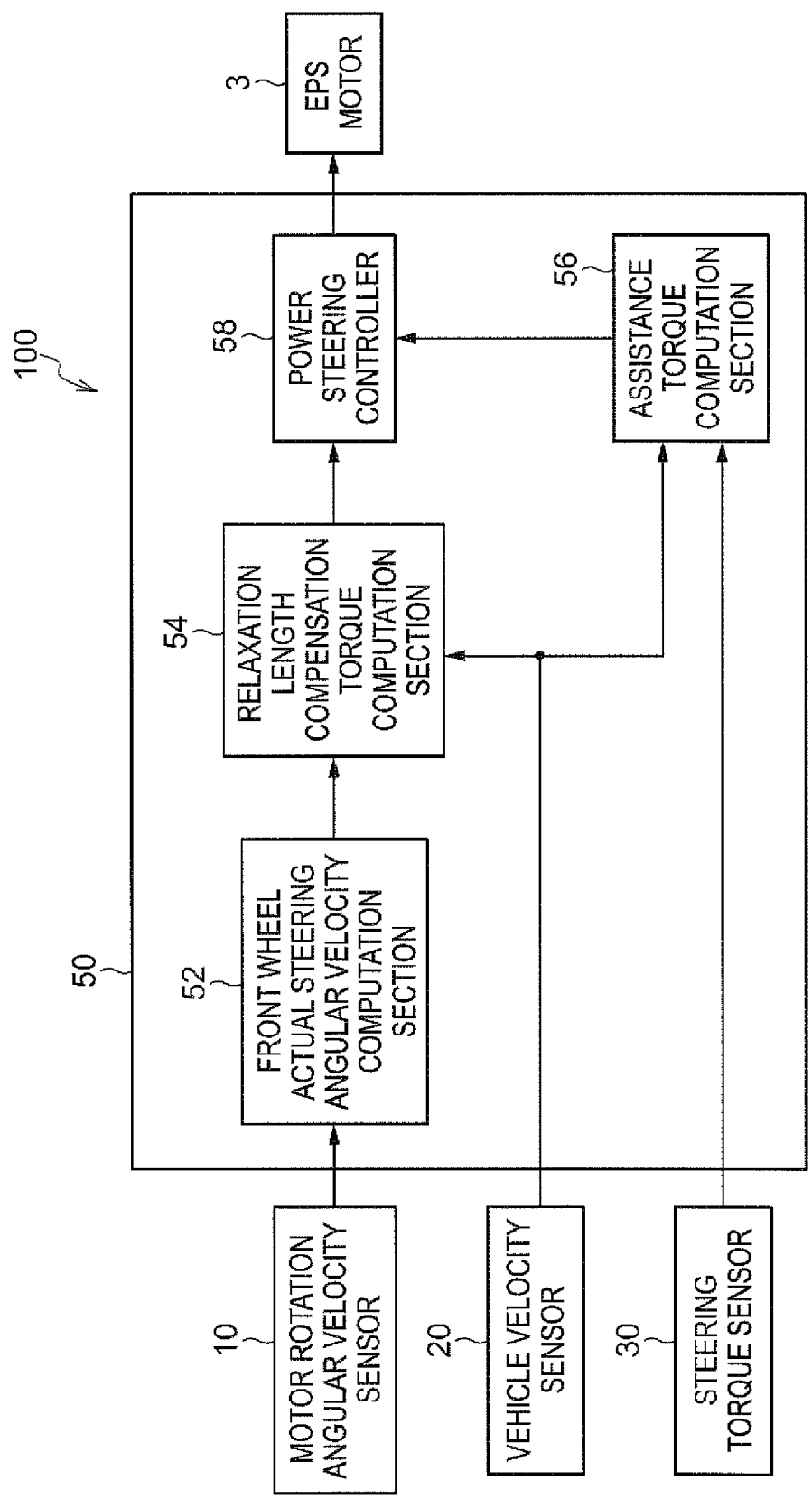
FIG. 19 is a block diagram illustrating a functional configuration of a vehicle steering apparatus according to a first exemplary embodiment.

Moreover, as illustrated in FIG. 19, the vehicle steering apparatus 100 according to the first exemplary embodiment of the present invention is equipped with a motor rotation angular velocity sensor 10, a vehicle velocity sensor 20, a steering torque sensor 30, and the EPS motor 3. The computer 50 of the vehicle steering apparatus 100 may be configured by a computer including a CPU, RAM, and a ROM stored with a program and various data for executing a compensation torque computation processing routine, described later.

The motor rotation angular velocity sensor 10 measures the rotation angular velocity of the EPS motor 3 and outputs this to the computer 50.

The vehicle velocity sensor 20 measures the vehicle velocity and outputs this to the computer 50.

The steering torque sensor 30 measures the steering torque and outputs this to the computer 50.

The computer 50 is equipped with a front wheel actual steering angular velocity computation section 52, a relaxation length compensation torque computation section 54, a assistance torque computation section 56, and a power steering controller power steering controller 58.

The front wheel actual steering angular velocity computation section 52 computes the front wheel actual steering angular velocity based on the motor rotation angular velocity input from the motor rotation angular velocity sensor 10, and outputs this to the relaxation length compensation torque computation section 54.

The relaxation length compensation torque computation section 54 computes the relaxation length compensation torque according to Equation (42), based on the predetermined G(s) corresponding to the vehicle velocity input from the vehicle velocity sensor 20, and based on the front wheel actual steering angular velocity input from the front wheel actual steering angular velocity computation section 52. The relaxation length compensation torque computation section 54 then outputs the computed relaxation length compensation torque to the power steering controller 58.

The assistance torque computation section 56 computes an assistance torque based on the vehicle velocity input from the vehicle velocity sensor 20 and based on the steering torque input from the steering torque sensor 30, and outputs the computed assistance torque to the power steering controller 58. Note that a known method may be employed as the computation method of the assistance torque, and detailed explanation thereof is omitted.

The power steering controller 58 adds the relaxation length compensation torque input from the relaxation length compensation torque computation section 54 to the assistance torque input from the assistance torque computation section 56, and controls the EPS motor 3 so as to generate the computed assistance torque.

Figure 20:
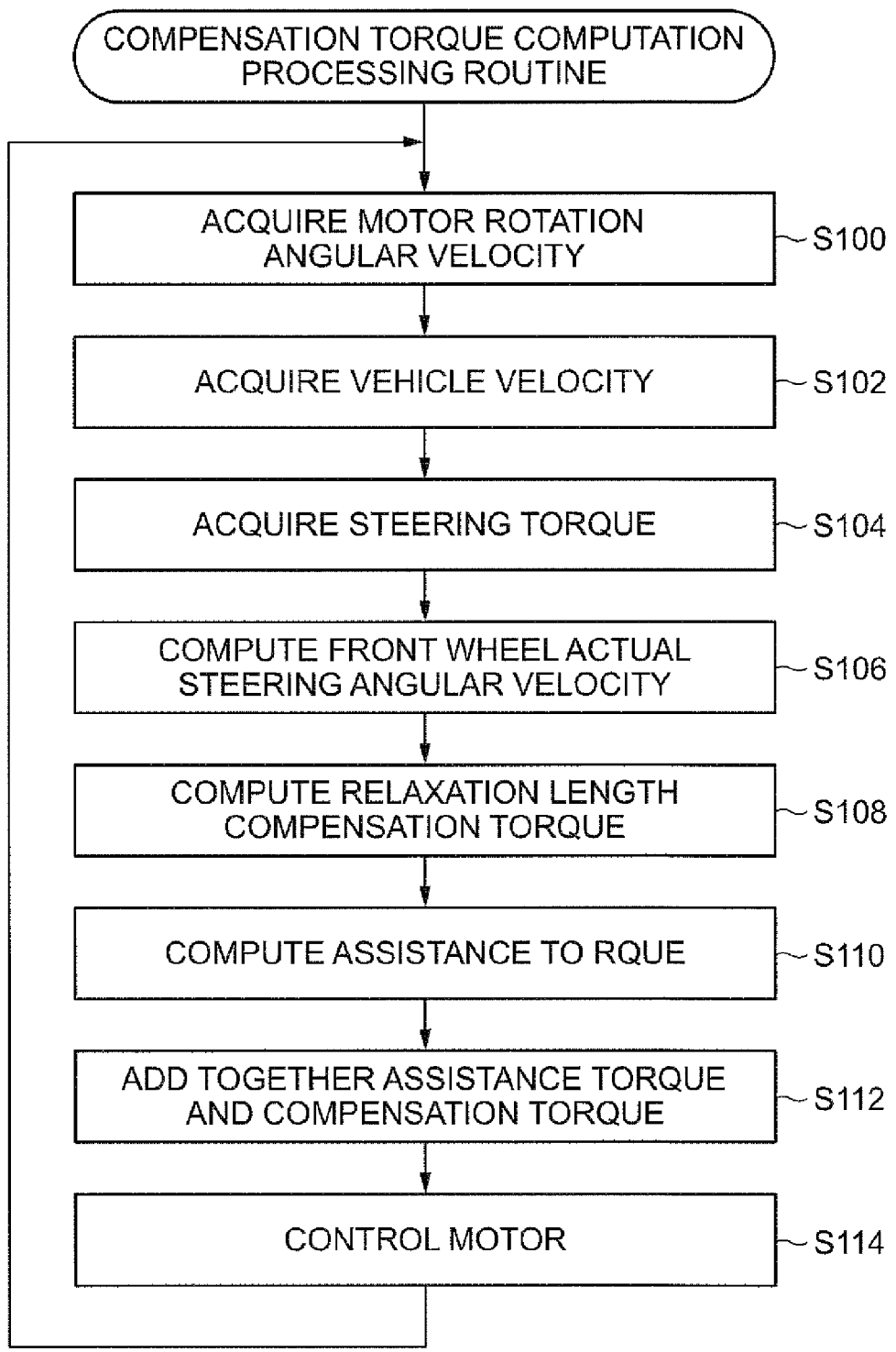
FIG. 20 is a flow chart illustrating a compensation torque computation processing routine in a vehicle steering apparatus according to the first exemplary embodiment.

Operation of the Vehicle Steering Apparatus
According to the First Exemplary Embodiment Explanation next follows regarding operation of the vehicle steering apparatus 100 according to the first exemplary embodiment of the present invention. The compensation torque computation processing routine illustrated in FIG. 20 is executed by the CPU executing a program stored in the ROM of the vehicle steering apparatus 100.

First, at step S100, the computer 50 acquires the motor rotation angular velocity measured by the motor rotation angular velocity sensor 10.

Then at step S102, the computer 50 acquires the vehicle velocity measured by the vehicle velocity sensor 20.

Then at step S104, the computer 50 acquires the steering torque measured by the steering torque sensor 30.

Then at step S106, the computer 50 computes the front wheel actual steering angular velocity based on the motor rotation angular velocity acquired at step S100.

Then at step S108, the computer 50 computes the relaxation length compensation torque according to Equation (42) based on the G(s) corresponding to the vehicle velocity acquired at step S102, and based on the front wheel actual steering angular velocity acquired at step S106.

Then at step S110, the computer 50 computes the assistance torque based on the vehicle velocity acquired at step S102 and based on the steering torque acquired at step S104.

Next at step S112, the computer 50 adds the relaxation length compensation torque acquired at step S108 to the assistance torque acquired at step S110. Then at step S114, the computer 50 controls the EPS motor 3 based on the assistance torque computed at step S112, and then processing returns to step S200.

According to the vehicle steering apparatus of the above exemplary embodiment of the present invention, the relaxation length compensation torque is computed with good precision, and power steering control is implemented that compensates for the influence of relaxation length, thereby enabling high handling performance to be implemented that compensates for the tire grip performance.

Moreover, in the vehicle steering apparatus, when computing the relaxation length compensation torque, the relaxation length compensation torque is computed according to the Equation (42) based on the detected front wheel actual steering angular velocity and the G(s) corresponding to the vehicle velocity. This thereby enables the relaxation length compensation torque to be computed with good precision, and a high handling performance to be realized.

Explanation next follows regarding a second exemplary embodiment. The second exemplary embodiment differs from the first exemplary embodiment in the point that the relaxation length compensation torque is computed according to the Equation (41) using a measured front wheel actual steering angle, and $(K(s)-K_0(s))$ corresponding to the vehicle velocity. Note that portions configured similarly to the vehicle steering apparatus 100 of the first exemplary embodiment are allocated the same reference numerals and further explanation omitted.

Figure 21:
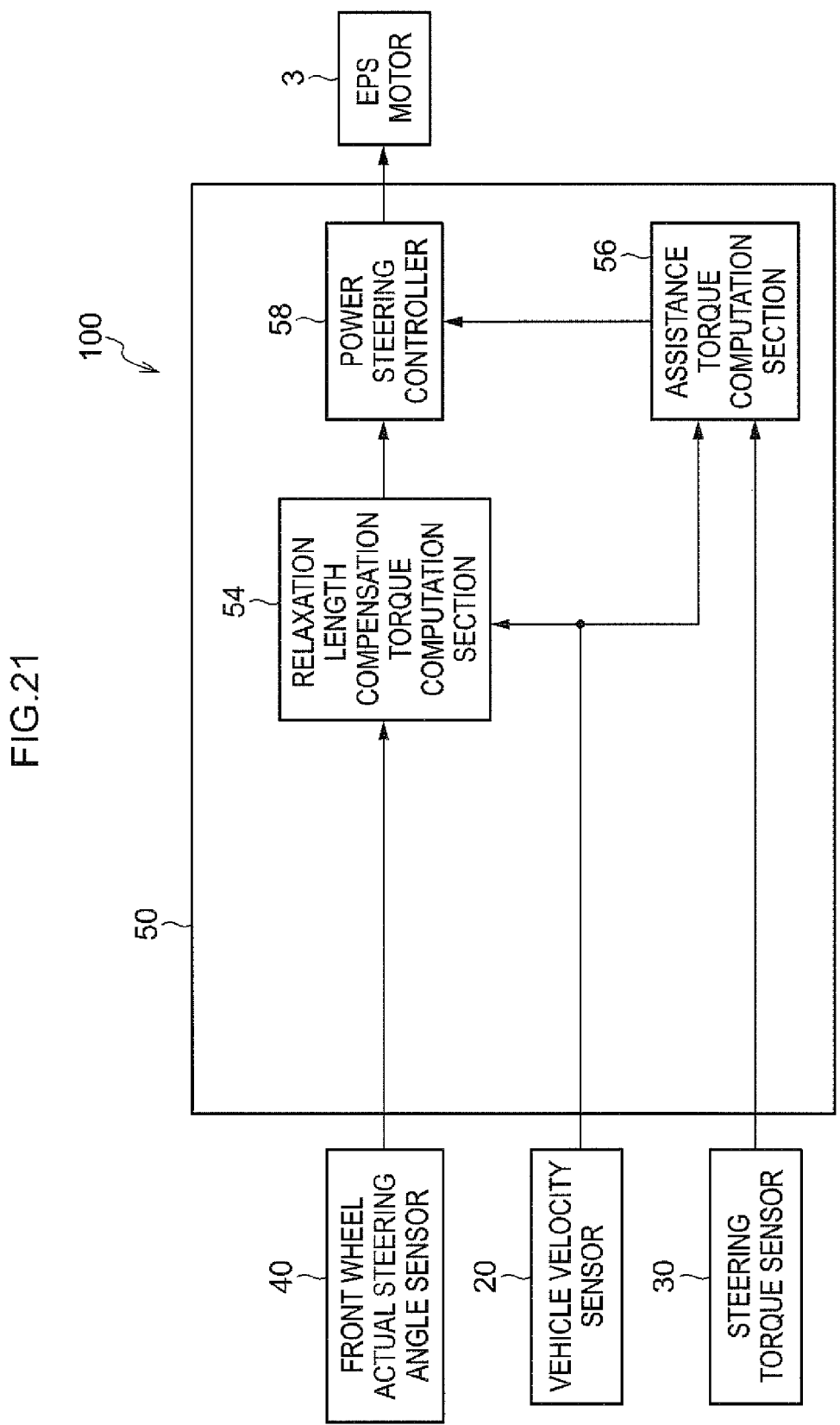
FIG. 21 is a block diagram illustrating a functional configuration of a vehicle steering apparatus according to a second exemplary embodiment.

Configuration of Vehicle Steering Apparatus
According to a Second Exemplary Embodiment As illustrated in FIG. 21, the vehicle steering apparatus 100 according to the second exemplary embodiment may be configured with a computer including a CPU, RAM, and a ROM stored with a program and various data for executing a compensation torque computation processing routine, described later. The vehicle steering apparatus 100 is functionally equipped with a front wheel actual steering angle sensor 40, a vehicle velocity sensor 20, a steering torque sensor 30, a computer 50, and an EPS motor 3, as illustrated in FIG. 21.

The front wheel actual steering angle sensor 40 measures the actual steering angle of the front wheels and outputs this to the relaxation length compensation torque computation section 54.

The relaxation length compensation torque computation section 54 of the computer 50 computes the relaxation length compensation torque according to the Equation (41) based on the front wheel actual steering angle input from a front wheel actual steering angle sensor and based on the predetermined $(K(s)-K_0(s))$ corresponding to the vehicle velocity input from the vehicle velocity sensor 20, and outputs the relaxation length compensation torque to the power steering controller 58. Note that the transfer function $(K(s)-K_0(s))$ is an example of a transfer function that is (1) expressed using the difference between the road surface reaction torque model and the referential reaction torque model, and is (2) expressed by the relaxation length compensation torque that is the steering torque predetermined according to vehicle velocity for compensating for the relaxation length for the front wheel steering angle state quantity.

Figure 22:
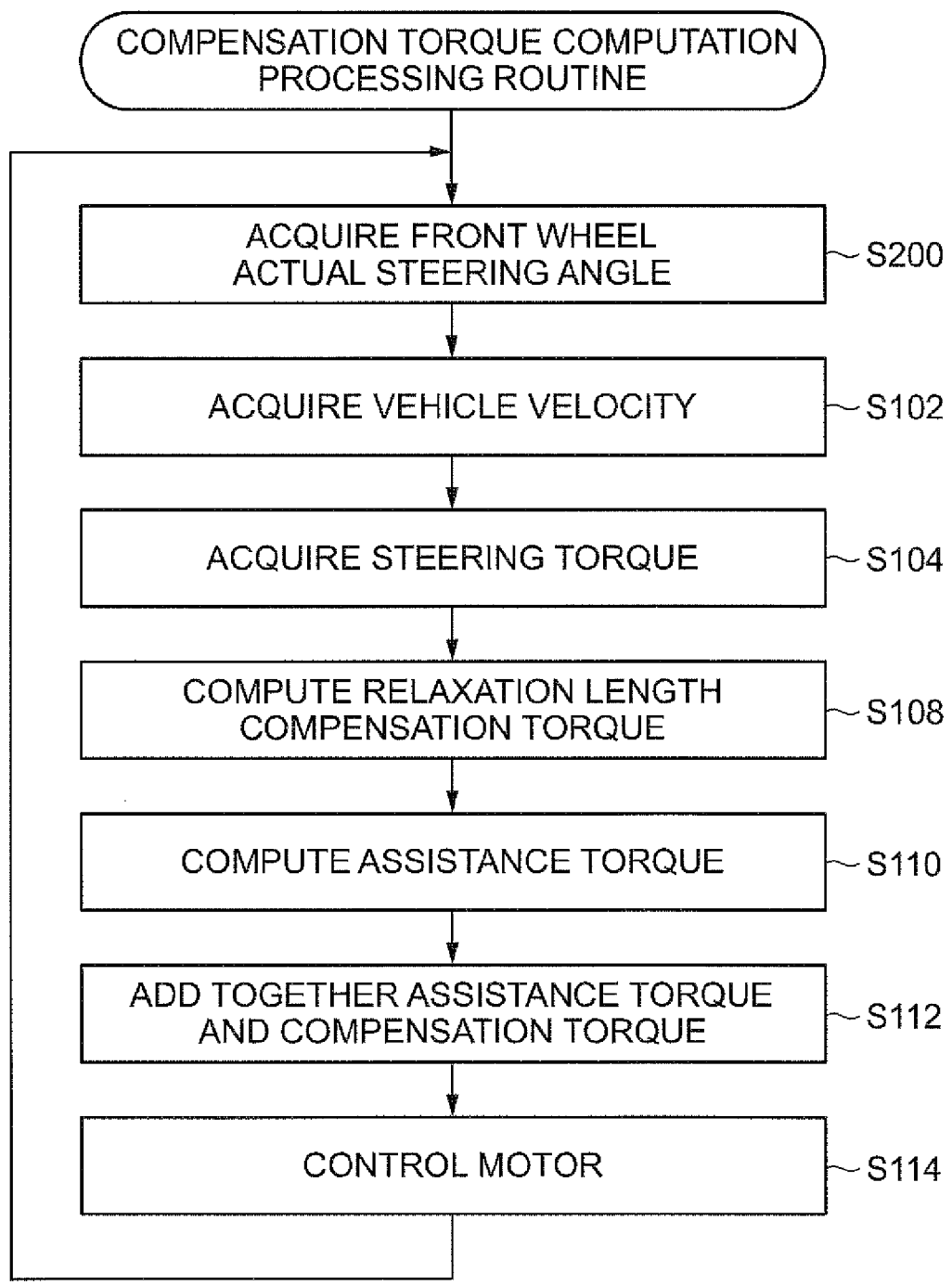
FIG. 22 is a flow chart illustrating a compensation torque computation processing routine in a vehicle steering apparatus according to the second exemplary embodiment.

Operation of the Vehicle Steering Apparatus
According to the Second Exemplary Embodiment Explanation next follows regarding operation of the vehicle steering apparatus 100 according to the second exemplary embodiment of the present invention. The compensation torque computation processing routine illustrated in FIG. 22 is executed by the CPU executing a program stored on the ROM of the vehicle steering apparatus 100.

At step S200, the computer 50 acquires the front wheel actual steering angle measured by the front wheel actual steering angle sensor 40.

At step S108, the computer 50 computes the relaxation length compensation torque according to the Equation (41) based on the front wheel actual steering angle acquired at step S200, and based on the $(K(s)-K_0(s))$ corresponding to the vehicle velocity acquired at step S102.

According to the vehicle steering apparatus of the second exemplary embodiment, computing the relaxation length compensation torque according to the Equation (41) based on the front wheel actual steering angle and based on the $(K(s)-K_0(s))$ corresponding to the vehicle velocity enables the relaxation length compensation torque to be computed with good precision, enabling high handling performance to be achieved.

Explanation next follows regarding a third exemplary embodiment. The third exemplary embodiment differs from the second exemplary embodiment in the point that the road surface reaction torque and the referential reaction torque are computed separately, and the relaxation length compensation torque is then computed from the difference between the computed road surface reaction torque and the referential reaction torque. Note that portions configured similarly to the vehicle steering apparatus 100 of the second exemplary embodiment are allocated the same reference numerals and further explanation thereof is omitted.

Figure 23:
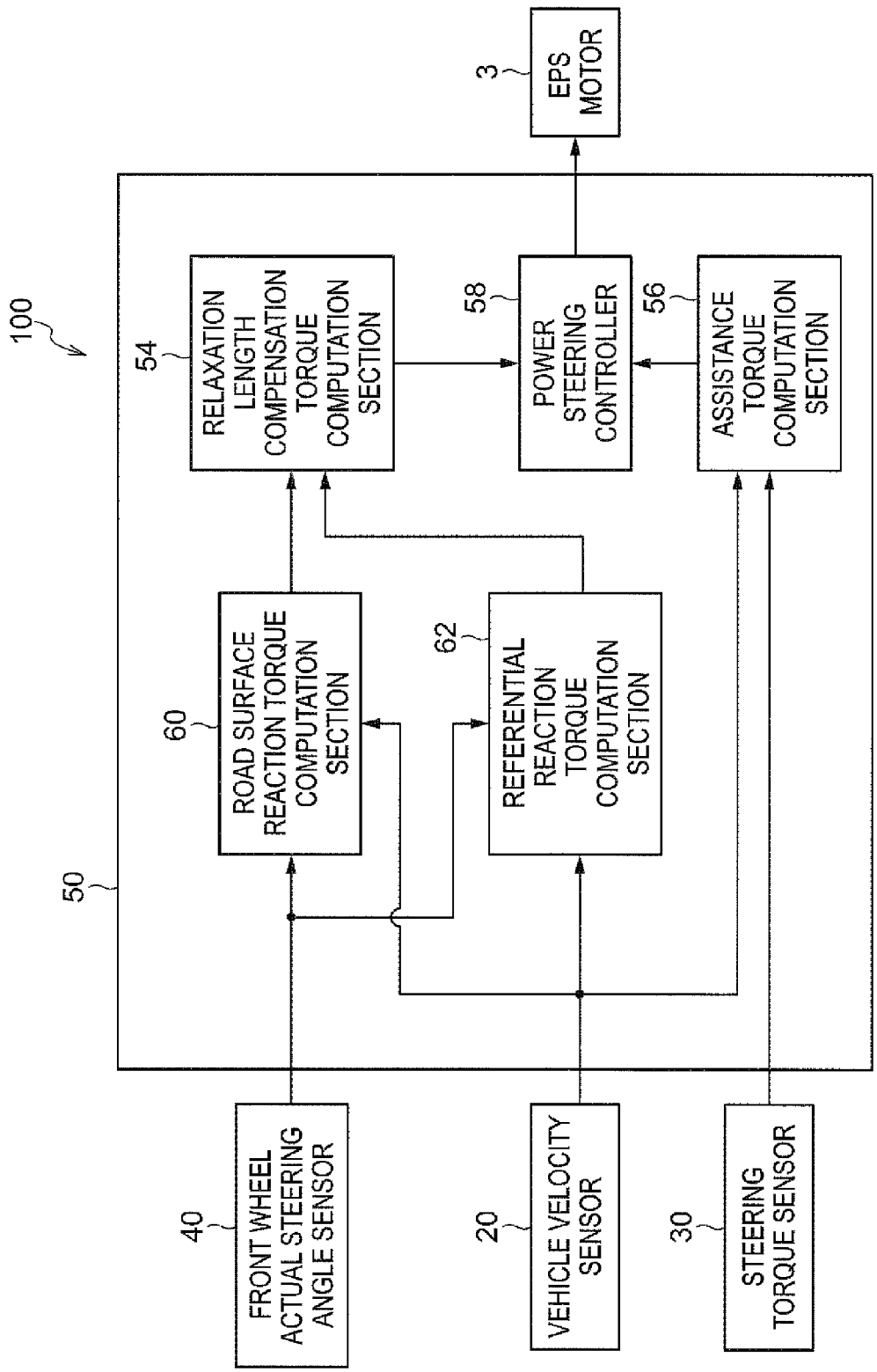
FIG. 23 is a block diagram illustrating a functional configuration of a vehicle steering apparatus according to a third exemplary embodiment.

Configuration of Vehicle Steering Apparatus
According to Third Exemplary Embodiment As illustrated in FIG. 23, the vehicle steering apparatus 100 according to the third exemplary embodiment may be configured by a computer including a CPU, RAM, and a ROM stored with a program and various data for executing a compensation torque computation processing routine, described later. The vehicle steering apparatus 100 is functionally equipped with a front wheel actual steering angle sensor 40, a vehicle velocity sensor 20, a steering torque sensor 30, a computer 50, and an EPS motor 3, as illustrated in FIG. 23.

A road surface reaction torque computation section 60 computes a road surface reaction torque $T_{SAT}$ according to the road surface reaction torque model expressed by Equations (22) to (30) based on the front wheel actual steering angle input from the front wheel actual steering angle sensor 40 and based on the vehicle velocity input from the vehicle velocity sensor 20, and outputs the road surface reaction torque $T_{SAT}$ to a relaxation length compensation torque computation section 54.

A referential reaction torque computation section 62 computes the referential reaction torque $T_{SAT}$ according to the referential reaction torque model expressed by Equations (31) to (39) based on the front wheel actual steering angle input from the front wheel actual steering angle sensor 40 and based on the vehicle velocity input from the vehicle velocity sensor 20, and outputs the $T_{SAT}$ to the relaxation length compensation torque computation section 54.

The relaxation length compensation torque computation section 54 computes the relaxation length compensation torque $T_c$ from the difference between the referential reaction torque input from the referential reaction torque computation section 62 and the road surface reaction torque input from the road surface reaction torque computation section 60, and outputs this to the power steering controller 58.

Figure 24:
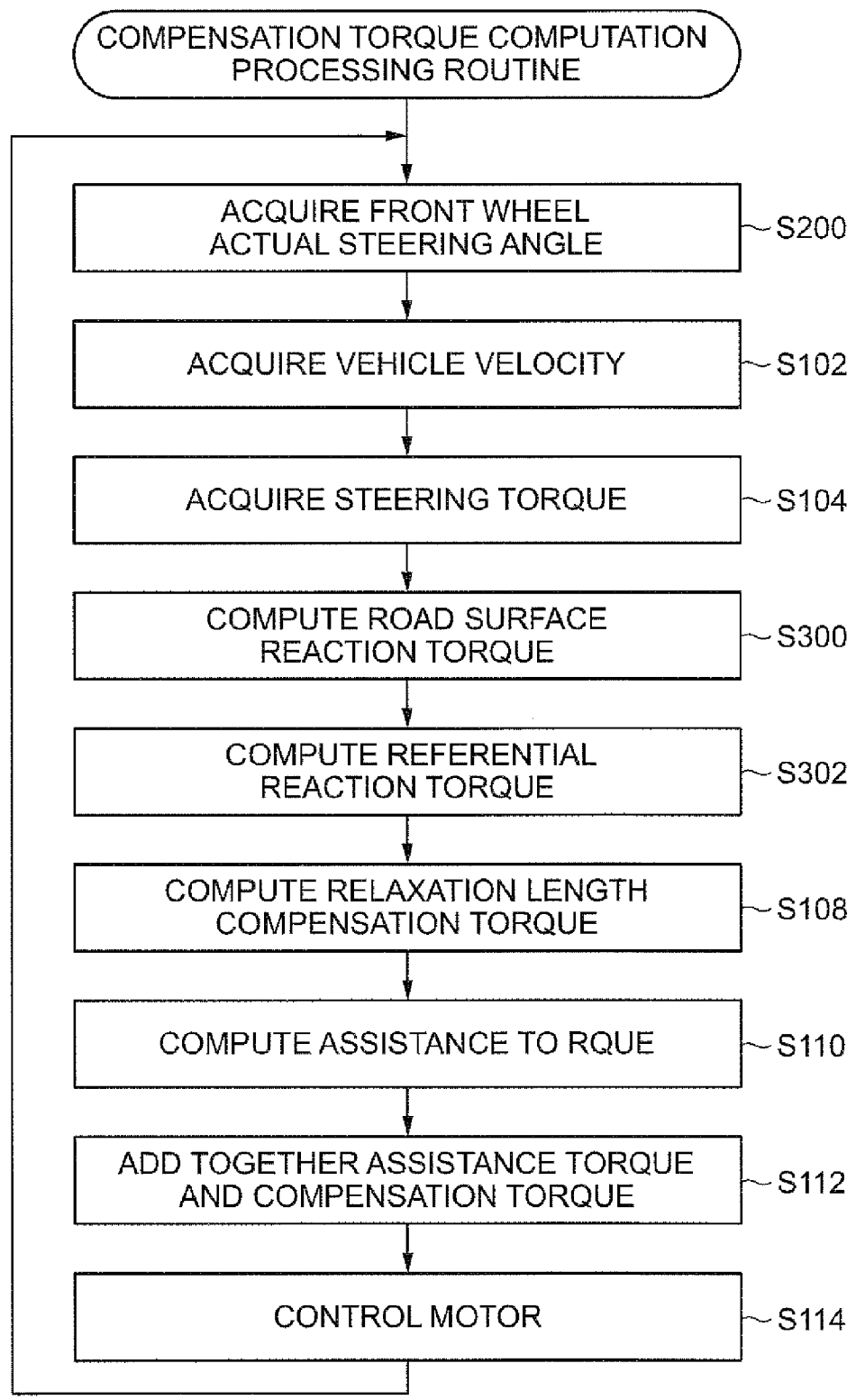
FIG. 24 is a flow chart illustrating a compensation torque computation processing routine in a vehicle steering apparatus according to the third exemplary embodiment.

Operation of the Vehicle Steering Apparatus
According to the Third Exemplary Embodiment Explanation follows regarding operation of the vehicle steering apparatus 100 according to the third exemplary embodiment of the present invention. A compensation torque computation processing routine illustrated in FIG. 24 is executed by the CPU executing a program stored on the ROM of the vehicle steering apparatus 100.

At step S300, the computer 50 computes the road surface reaction torque according to the road surface reaction torque model expressed by Equations (22) to (30) based on the front wheel actual steering angle acquired at step 200 and on the vehicle velocity acquired at step S102.

At step S302, the computer 50 computes the referential reaction torque according to the referential reaction torque model expressed by Equations (31) to (39) based on the acquired front wheel actual steering angle acquired at step S200 and on the vehicle velocity acquired at step S102.

At step S108, the computer 50 computes a relaxation length compensation torque from the difference between the referential reaction torque acquired at step S302 and the road surface reaction torque acquired at step S300.

According to the above vehicle steering apparatus of the third exemplary embodiment, the referential reaction torque and the road surface reaction torque are computed separately, and then the relaxation length compensation torque is computed from their difference, thereby enabling relaxation length compensation torque to be computed with good precision, and enabling a high handling performance to be achieved.

Note that the vehicle steering apparatus may be configured to compute the front wheel actual steering angle based on the motor rotation angular velocity, to compute the front wheel actual steering angle from the front wheel actual steering angular velocity, to employ the computed front wheel actual steering angle to separately compute the referential reaction torque and the road surface reaction torque, and to compute the relaxation length compensation torque from the difference therebetween.

Explanation next follows regarding a fourth exemplary embodiment. The fourth exemplary embodiment differs from the first exemplary embodiment in the point that the relaxation length compensation torque is derived by a controller using a vehicle motion model in which high grip tires are mounted as the referential reaction torque model, and by using the front wheel actual steering angle, and by employing a transfer function $G(s)$. Note that portions configures similarly to the vehicle steering apparatus 100 of the first exemplary embodiment are allocated the same reference numeral and further explanation is omitted thereof.

The above first to third exemplary embodiments are directed towards compensating for lag of relaxation length, however it is possible to model the handling sensation when high grip tires are mounted by changing the tire characteristics employed in the referential reaction torque model. The steady state gain from the steering angle to the road surface reaction torque can be expressed by:

$$\frac{T_{SAT}(0)}{\delta(0)} = \frac{L_r K_f K_r M V^2}{(L_f + L_r)^2 K_f K_r - (L_f K_f - L_r K_r) M V^2} \quad \text{Equation (43)}$$

When $K_f$, $K_r$ are increased such that there is no change in this value, the vehicle motion model containing the tire relaxation length expressed by Equations (22) to (30) and the high grip ideal vehicle motion model not containing the tire relaxation length expressed by Equations (31) to (39) match in the steady state.

When this occurs, the constant term in the numerator polynomial of the transfer function of the controller becomes 0, and this enables a controller to be designed that uses the front wheel actual steering angular velocity, similarly to in Equation (42).

Figure 15:
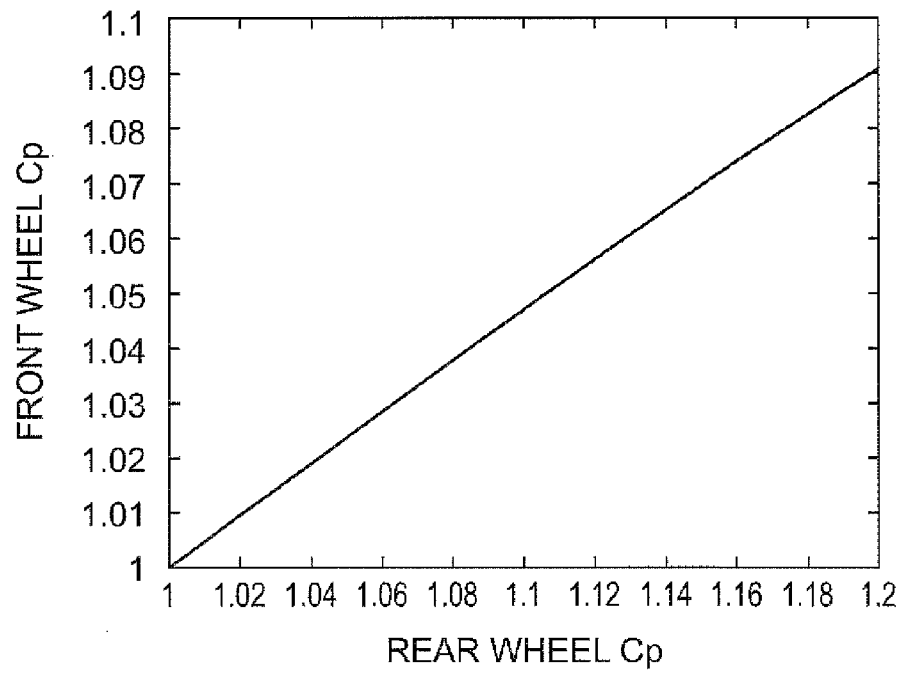
FIG. 15 is a graph illustrating a relationship of increasing cornering power of the front and rear wheels such that there is no change in constant gain from the steering angle to the road surface reaction torque.

FIG. 15 illustrates the amount of increase in the cornering power of the front wheels to maintain Equation (43) at a constant value of when the rear wheel cornering power is increased by a constant multiple based on the vehicle data used the current time. From the data when the rear wheel cornering power is 1.2 times, if the front wheel cornering power is also 1.090 times then this gives no change in the constant gain from the steering angle to the road surface reaction torque.

Figure 16:
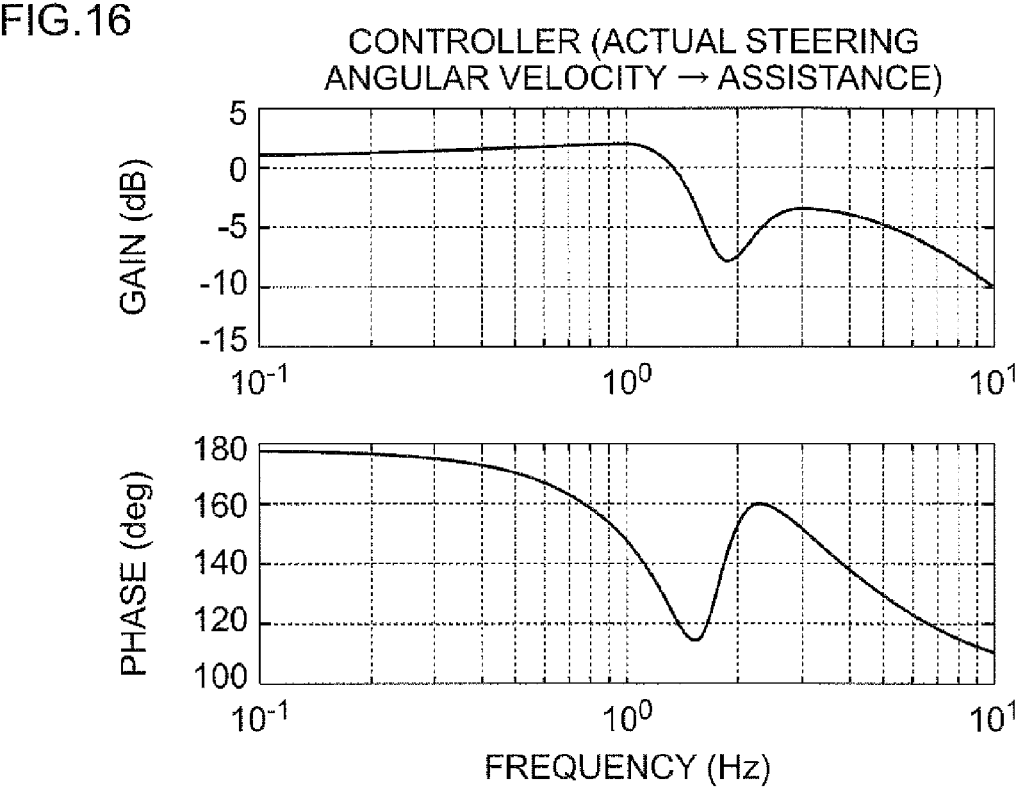
FIG. 16 is a diagram illustrating a controller (grip increase) when the front wheel actual steering angular velocity is an observed quantity.

FIG. 16 illustrates a Bode plot of a controller for computing the compensation torque from the front wheel actual steering angular velocity in order to achieve a handling sensation by making the front wheel cornering power 1.0909 times when the rear wheel cornering power is 1.2 times. It can be seen from comparison with the characteristics of FIG. 8 that gain in the low frequency region is slightly increased to increase the grip.

Figure 17:
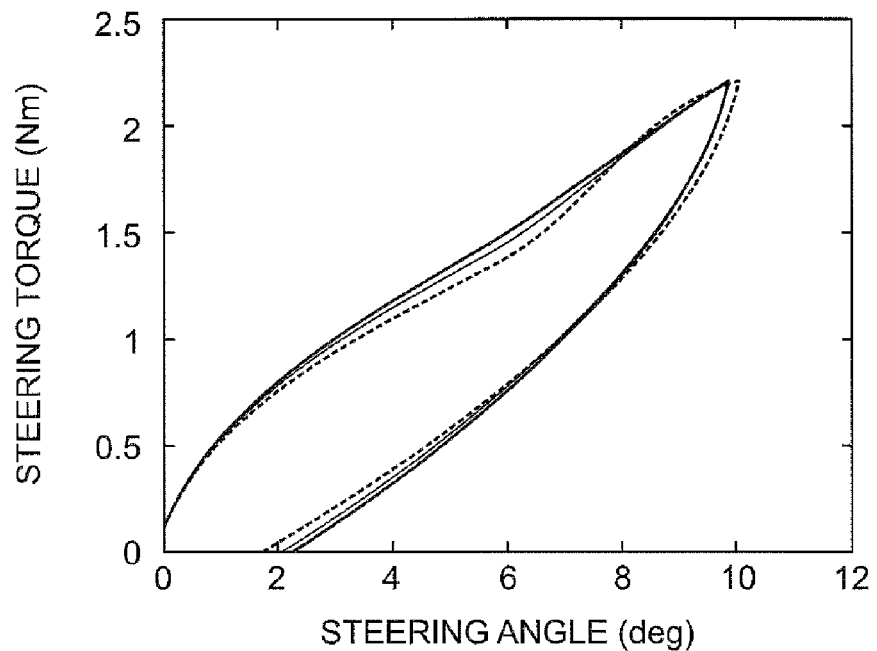
FIG. 17 is a diagram illustrating characteristics of steering torque against steering angle.
Figure 18:
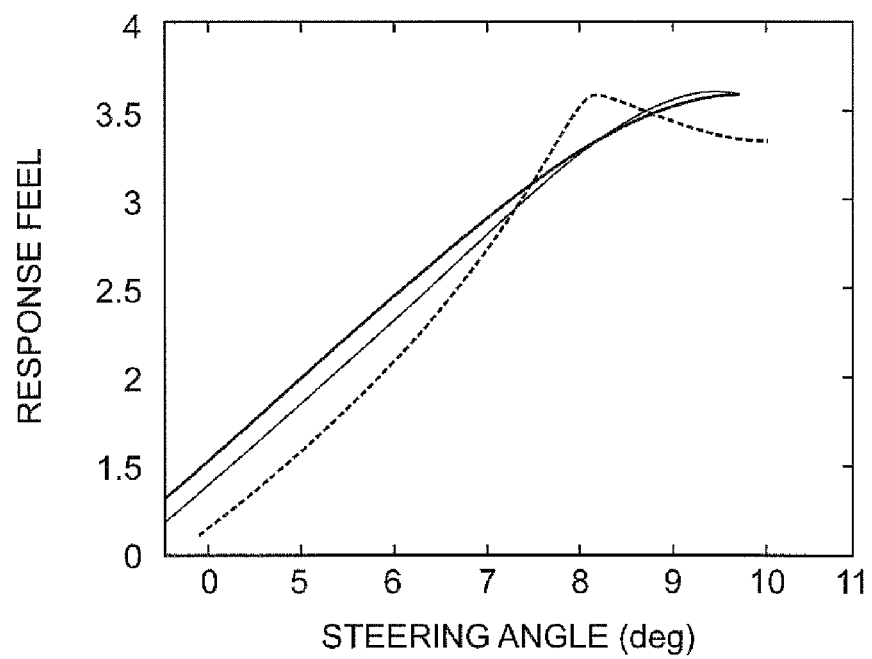
FIG. 18 is diagram illustrating characteristics of response feel against steering angle.

FIG. 17 illustrates a comparison of steering torque against steering angle when, during travel at 100 km/h, a steering torque of 2.2 Nm is input with a sine wave profile of 1.0 rad/s, with the bold line of the results of performing compensation for grip increase added to the characteristics illustrated in FIG. 13. Moreover, FIG. 18 illustrates results of computing response feel felt by a driver when turning of the steering wheel is increased as computed from the steering angle and steering torque. The response feel in a slight steering angle region is increased by performing control to increase the grip. Note that illustration is given wherein the solid lines are when there is relaxation length compensation, the intermittent lines are when there is no such control, and bold lines are when there is compensation of grip increase.

Configuration of Vehicle Steering Apparatus According to Fourth Exemplary Embodiment When the relaxation length compensation torque computation section 54 of the vehicle steering apparatus 100 of the fourth exemplary embodiment computes the relaxation length compensation torque according to Equation (42) based on (1) the front wheel actual steering angular velocity input from the front wheel actual steering angular velocity computation section 52 and (2) G(s) corresponding to the measured vehicle velocity predetermined in conditions to increase $K_f$, $K_r$ such that there is no change in the value of Equation (43), and outputs the computed relaxation length compensation torque to the power steering controller 58.

Operation of the Vehicle Steering Apparatus According to the Fourth Exemplary Embodiment Explanation next follows regarding operation of the vehicle steering apparatus 100 according to the fourth exemplary embodiment of the present invention. A compensation torque computation processing routine illustrated in FIG. 20 is executed by the CPU executing a program stored on the ROM of the vehicle steering apparatus 100.

At step S108, the computer 50 computes the relaxation length compensation torque according to Equation (42) based on (1) the front wheel actual steering angular velocity input at step S106 from the front wheel actual steering angular velocity computation section 52 and (2) the G(s) corresponding to the vehicle velocity acquired at step S102 predetermined under the condition of increasing $K_f$, $K_r$ such that there is no change in the value of Equation (43).

According to the vehicle steering apparatus of the fourth exemplary embodiment, the relaxation length compensation torque is computed according to Equation (42) based on the front wheel actual steering angular velocity and the predetermined G(s) corresponding to the vehicle velocity under the condition of increasing $K_f$, $K_r$ such that there is no change in the value of Equation (43). The handling sensation when mounted with high grip tires is thereby modeled, enabling high handling performance to be realized.

Moreover, in the present invention it is possible to compensate for the grip performance of tires that have characteristics for reducing fuel consumption (reducing rolling resistance) and reducing cost, enabling a vehicle with high handling performance to be achieved whilst reducing cost.

Note that the fourth exemplary embodiment may be applied to technology for computing relaxation length compensation torque by using the measured front wheel actual steering angle as explained above with reference to the second exemplary embodiment and the $(K(s)-K_0(s))$ corresponding to the vehicle velocity. In such cases, the vehicle steering apparatus 100 may be configured to compute the relaxation length compensation torque based on the measured front wheel actual steering angle and the $(K(s)-K_0(s))$ when $K_f$, $K_r$ are set to desired values.

Moreover, the fourth exemplary embodiment may be applied to technology that separately computes the road surface reaction torque and the referential reaction torque based on the measured front wheel actual steering angle and vehicle velocity as explained in the third exemplary embodiment, and then computes the relaxation length compensation torque from the difference between the computed road surface reaction torque and the referential reaction torque. In such cases, the vehicle steering apparatus 100 may be configured to compute the road surface reaction torque and the referential reaction torque according to the road surface reaction torque model and the referential reaction torque model when $K_f$, $K_r$ are set to desired values.

Moreover, the present invention is not limited to the above exemplary embodiments, and various modifications and applications are possible within a scope not departing from the spirit of the invention.

Moreover, although explanation has been given in the present application specification of exemplary embodiments in which programs are pre-installed, these programs may be provided stored on computer-readable recording mediums, or may be provided over a network. Moreover, each of the sections of the vehicle steering apparatus 100 of the present exemplary embodiments may be configured by hardware.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A vehicle steering apparatus comprising:
   a vehicle velocity detection unit that detects a vehicle velocity;
   a state amount detection unit that detects a front wheel actual steering angle state amount of a vehicle;
   a computation unit that computes a relaxation length compensation torque based on
   (1) a transfer function that is (a) expressed using a difference between a road surface reaction torque model that considers dynamic characteristics of tires according to a relaxation length to derive a first road surface reaction torque based on the front wheel actual steering angle state amount, and a referential reaction torque model that does not consider the dynamic characteristics of tires according to the relaxation length to derive a second road surface reaction torque based on the front wheel actual steering angle state amount, and that (b) expresses a relaxation length compensation torque that is a steering torque predetermined according to the vehicle velocity detected by the vehicle velocity detection unit to compensate for the relaxation length for the front wheel actual steering angle state, and
   (2) the front wheel actual steering angle state amount detected by the state amount detection unit;
   a summing unit that adds the relaxation length compensation torque computed by the computation unit to an assistance torque of electrical power steering; and
   a steering torque control unit that controls so as to generate the assistance torque that has been summed by the summing unit.

2. A vehicle steering apparatus comprising:
   a vehicle velocity detection unit that detects a vehicle velocity;
   a state amount detection unit that detects a front wheel actual steering angle state amount of a vehicle;
   a road surface reaction torque computation unit that computes a first road surface reaction torque based on (1) a road surface reaction torque model that considers dynamic characteristics of tires according to a relaxation length and that is predetermined to derive the first road surface reaction torque based on the front wheel actual steering angle state amount, on (2) the front wheel actual steering angle state amount detected by the state amount detection unit, and on (3) the vehicle velocity detected by the vehicle velocity detection unit;
   a referential reaction torque computation unit that computes a second road surface reaction torque based on (1) a referential reaction torque model that does not consider the dynamic characteristics of tires according to the relaxation length and that is predetermined to derive the second road surface reaction torque based on the front wheel actual steering angle state amount, on (2) the front wheel actual steering angle state amount, and on (3) the vehicle velocity;
   a relaxation length compensation torque computation unit that computes a difference between the second road surface reaction torque computed by the referential reaction torque computation unit and the first road surface reaction torque computed by the road surface reaction torque computation unit as a relaxation length compensation torque that is a steering torque to compensate for the relaxation length;
   a summing unit that adds the relaxation length compensation torque computed by the relaxation length compensation torque computation unit to an assistance torque of electrical power steering; and
   a steering torque control unit that controls so as to generate the assistance torque that has been summed by the summing unit.

3. The vehicle steering apparatus of claim 1, wherein the state amount detection unit detects a front wheel actual steering angular velocity as the front wheel actual steering angle state amount.

4. The vehicle steering apparatus of claim 1, wherein the state amount detection unit detects a front wheel actual steering angle as the front wheel actual steering angle state amount.

5. The vehicle steering apparatus of claim 1, wherein the referential reaction torque model does not consider the dynamic characteristics of tires according to the relaxation length and is a referential reaction torque model to derive road surface reaction torque when mounted with high grip tires.

6. A vehicle steering method comprising:
   detecting a vehicle velocity;
   detecting a front wheel actual steering angle state amount of a vehicle;
   computing a relaxation length compensation torque based on
   (1) a transfer function that is (a) expressed using a difference between a road surface reaction torque model that considers dynamic characteristics of tires according to a relaxation length to derive a first road surface reaction torque based on the front wheel actual steering angle state amount, and a referential reaction torque model that does not consider the dynamic characteristics of tires according to the relaxation length to derive a second road surface reaction torque based on the front wheel actual steering angle state amount, and that (b) expresses a relaxation length compensation torque that is a steering torque predetermined according to the detected vehicle velocity to compensate for the relaxation length for the front wheel actual steering angle state, and
   (2) the front wheel actual steering angle state amount detected by the state amount detection unit;
   adding the computed relaxation length compensation torque to an assistance torque of electrical power steering; and
   controlling to generate the summed assistance torque.

7. A vehicle steering method comprising:
   detecting a vehicle velocity;
   detecting a front wheel actual steering angle state amount of a vehicle;

computing a first road surface reaction torque based on (1) a road surface reaction torque model that considers dynamic characteristics of tires according to a relaxation length and that is predetermined to derive the first road surface reaction torque based on the front wheel actual steering angle state amount, on (2) the detected front wheel actual steering angle state, and on (3) the detected vehicle velocity;

computing a second road surface reaction torque based on (1) a referential reaction torque model that does not consider the dynamic characteristics of tires according to the relaxation length and that is predetermined to derive the second road surface reaction torque based on the front wheel actual steering angle state amount, on (2) the front wheel actual steering angle state amount, and on (3) the vehicle velocity;

computing a difference between the computed second road surface reaction torque and the computed first road surface reaction torque as a relaxation length compensation torque that is a steering torque to compensate for the relaxation length;

adding the computed relaxation length compensation torque to an assistance torque of electrical power steering; and controlling to generate the summed assistance torque.

8. A non-transitory computer readable medium storing a program causing a computer to execute a process for vehicle steering control, the process comprising:

detecting a vehicle velocity;

detecting a front wheel actual steering angle state amount of a vehicle;

computing a relaxation length compensation torque based on (1) a transfer function that is (a) expressed using a difference between a road surface reaction torque model that considers dynamic characteristics of tires according to a relaxation length to derive a first road surface reaction torque based on the front wheel actual steering angle state amount, and a referential reaction torque model that does not consider the dynamic characteristics of tires according to the relaxation length to derive a second road surface reaction torque based on the front wheel actual steering angle state amount, and that (b) expresses a relaxation length compensation torque that is a steering torque predetermined according to the detected vehicle velocity to compensate for the relaxation length for the front wheel actual steering angle state, and (2) the detected front wheel actual steering angle state amount;

adding the computed relaxation length compensation torque to an assistance torque of electrical power steering; and controlling to generate the summed assistance torque.

9. A non-transitory computer readable medium storing a program causing a computer to execute a process for vehicle steering control, the process comprising:

detecting a vehicle velocity;

detecting a front wheel actual steering angle state amount of a vehicle;

computing a first road surface reaction torque based on (1) a road surface reaction torque model that considers dynamic characteristics of tires according to a relaxation length and that is predetermined to derive the first road surface reaction torque based on the front wheel actual steering angle state amount, on (2) the detected front wheel actual steering angle state, and on (3) the detected vehicle velocity;

computing a second road surface reaction torque based on (1) a referential reaction torque model that does not consider the dynamic characteristics of tires according to the relaxation length and that is predetermined to derive the second road surface reaction torque based on the front wheel actual steering angle state amount, on (2) the front wheel actual steering angle state amount, and on (3) the vehicle velocity;

computing a difference between the computed second road surface reaction torque and the computed first road surface reaction torque as a relaxation length compensation torque that is a steering torque to compensate for the relaxation length;

adding the computed relaxation length compensation torque to an assistance torque of electrical power steering; and controlling to generate the summed assistance torque.

\* \* \* \* \*